United States Patent
Kodama et al.

(10) Patent No.: US 7,406,202 B2
(45) Date of Patent: Jul. 29, 2008

(54) IMAGE PROCESSING APPARATUS, IMAGE COMPRESSION APPARATUS, IMAGE PROCESSING METHOD, IMAGE COMPRESSION METHOD, PROGRAM, AND RECORDING MEDIUM

(75) Inventors: Taku Kodama, Kanagawa (JP); Keiichi Suzuki, Tokyo (JP); Takashi Maki, Kanagawa (JP); Ikuko Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 941 days.

(21) Appl. No.: 10/781,551

(22) Filed: Feb. 17, 2004

(65) Prior Publication Data

US 2004/0213466 A1 Oct. 28, 2004

(30) Foreign Application Priority Data

Feb. 17, 2003 (JP) .............................. 2003-037919

(51) Int. Cl.
*G06K 9/36* (2006.01)
(52) U.S. Cl. .................. 382/232; 382/239; 382/240
(58) Field of Classification Search ................ 382/232, 382/233, 299, 239, 240; 341/50, 51, 106, 341/167; 348/581; 358/434; 711/170; 375/240.12, 375/240.18, 240.03, E7.05, E7.048; 713/190, 713/194, 331
See application file for complete search history.

(56) References Cited

U.S. PATENT DOCUMENTS

| | | | | |
|---|---|---|---|---|
| 5,365,602 A | * | 11/1994 | Levien | .................. 382/299 |
| 5,663,721 A | * | 9/1997 | Rossi | .................. 341/51 |
| 6,359,548 B1 | * | 3/2002 | Cooper | .................. 341/50 |
| 6,405,316 B1 | * | 6/2002 | Krishnan et al. | ............. 713/190 |
| 6,819,712 B2 | * | 11/2004 | Kawashima et al. | ... 375/240.03 |
| 7,129,860 B2 | * | 10/2006 | Alvarez et al. | .................. 341/51 |

FOREIGN PATENT DOCUMENTS

| | | |
|---|---|---|
| JP | 2000-134623 | 5/2000 |
| JP | 2001-285645 | 10/2001 |
| JP | 2002-165098 | 6/2002 |
| JP | 2002-247580 | 8/2002 |
| JP | 2002-315000 | 10/2002 |
| JP | 2003-037740 | 2/2003 |

OTHER PUBLICATIONS

Japanese Office Action for JP Application No: JP 2003-037919, Issue Date: May 29, 2007 (2 pages).
JPEG 2000 Part 1, FDIS (Final Draft International Standard), Mar. 2000, pp. 1-204.

* cited by examiner

*Primary Examiner*—Anh Hong Do
(74) *Attorney, Agent, or Firm*—Blakely, Sokoloff, Taylor & Zafman LLP

(57) ABSTRACT

An image processing apparatus for generating data to be used for image processing, in which the image processing apparatus includes, a dividing unit dividing code data of a compressed image into a plurality of segments, a code size computing unit computing a code size corresponding to each of the plurality of segments, and a memory unit storing the corresponding relation between the code size and each of the plurality of segments.

16 Claims, 22 Drawing Sheets

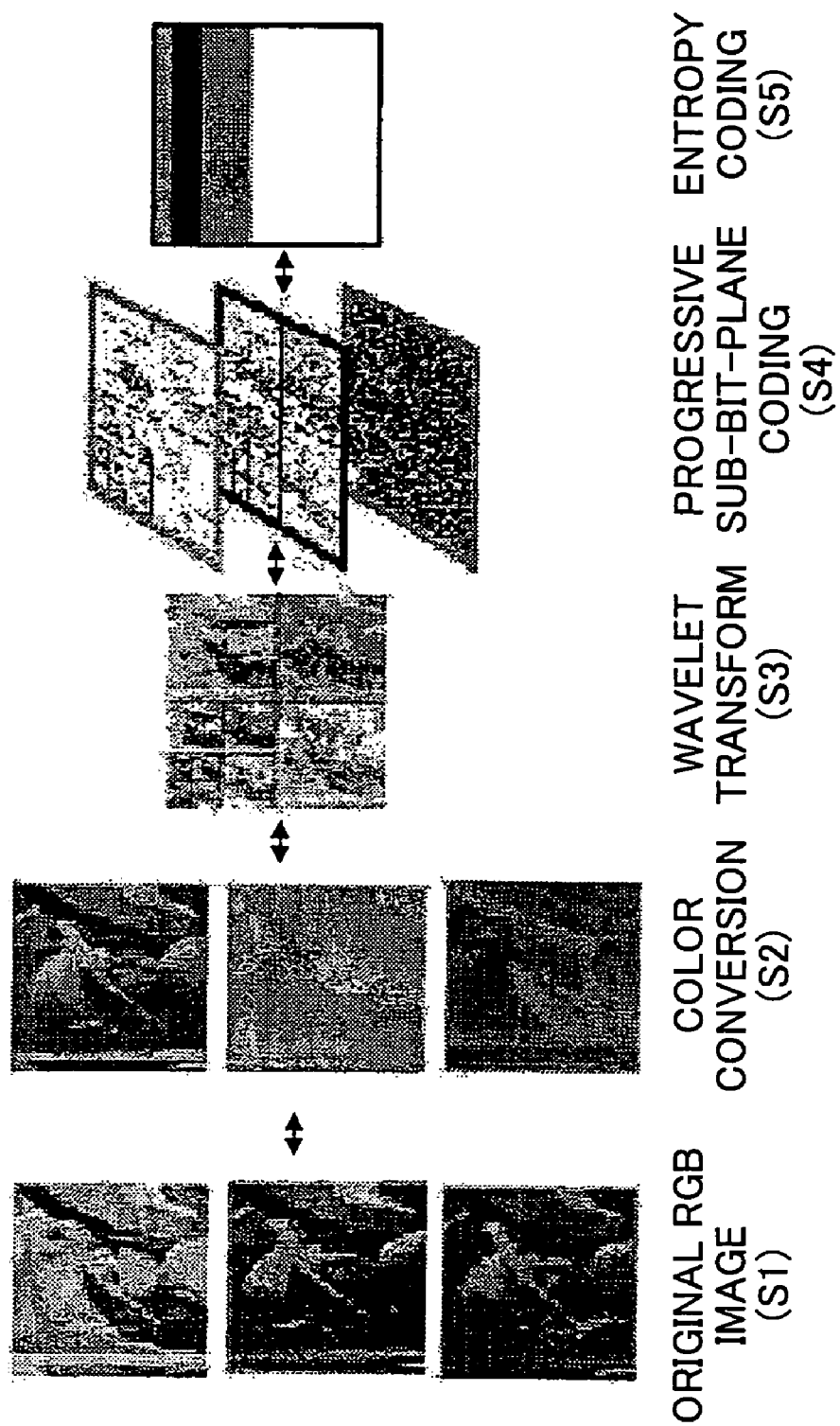

0LL
(ORIGINAL IMAGE TILE)

DECOMPOSITION_LEVEL_0

| 1LL | 1HL |
| --- | --- |
| 1LH | 1HH |

DECOMPOSITION_LEVEL_1

| 2LL | 2HL |
| --- | --- |
| 2LH | 2HH |

DECOMPOSITION_LEVEL_2

3LL  3HL
3LH
3HH

DECOMPOSITION_LEVEL_3

FIG.6

| SUB-BAND | PRECINCT No. | SUB-BIT PLANE | Code Of Bit 12 MSB | Code Of Bit 11 | Code Of Bit 10 | Code Of Bit 9 | Code Of Bit 8 | Code Of Bit 7 | Code Of Bit 6 | Code Of Bit 5 | Code Of Bit 4 | Code Of Bit 3 | Code Of Bit 2 | Code Of Bit 1 LSB |
|---|---|---|---|---|---|---|---|---|---|---|---|---|---|---|
| 1HH | 51 | 8 | | | 72 | 93 | 114 | 135 | 156 | 177 | 198 | 215 | 228 | |
| 1HH | 50 | 7 | | | 71 | 92 | 113 | 134 | 155 | 176 | 197 | 214 | 227 | |
| 1HH | 49 | 6 | | | 70 | 91 | 112 | 133 | 154 | 175 | 196 | 213 | 226 | |
| 1HH | 48 | 5 | | | 69 | 90 | 111 | 132 | 153 | 174 | 195 | 212 | 225 | |
| 1HH | 47 | 4 | | | 68 | 89 | 110 | 131 | 152 | 173 | 194 | 211 | 224 | |
| 1HH | 46 | 3 | | | 67 | 88 | 109 | 130 | 151 | 172 | 193 | 210 | 223 | |
| 1HH | 45 | 2 | | | 66 | 87 | 108 | 129 | 150 | 171 | 192 | 209 | 222 | |
| 1HH | 44 | 1 | | | 65 | 86 | 107 | 128 | 149 | 170 | 191 | 208 | 221 | |
| 1HH | 43 | 0 | | | 64 | 85 | 106 | 127 | 148 | 169 | 190 | 207 | 220 | |
| 1LH | 42 | 8 | | | 72 | 93 | 114 | 135 | 156 | 177 | 198 | 215 | 228 | |
| 1LH | 41 | 7 | | | 71 | 92 | 113 | 134 | 155 | 176 | 197 | 214 | 227 | |
| 1LH | 40 | 6 | | | 70 | 91 | 112 | 133 | 154 | 175 | 196 | 213 | 226 | |
| 1LH | 39 | 5 | | | 69 | 90 | 111 | 132 | 153 | 174 | 195 | 212 | 225 | |
| 1LH | 38 | 4 | | | 68 | 89 | 110 | 131 | 152 | 173 | 194 | 211 | 224 | |
| 1LH | 37 | 3 | | | 67 | 88 | 109 | 130 | 151 | 172 | 193 | 210 | 223 | |
| 1LH | 36 | 2 | | | 66 | 87 | 108 | 129 | 150 | 171 | 192 | 209 | 222 | |
| 1LH | 35 | 1 | | | 65 | 86 | 107 | 128 | 149 | 170 | 191 | 208 | 221 | |
| 1LH | 34 | 0 | | | 64 | 85 | 106 | 127 | 148 | 169 | 190 | 207 | 220 | |
| 1HL | 33 | 8 | | | 72 | 93 | 114 | 135 | 156 | 177 | 198 | 215 | 228 | |
| 1HL | 32 | 7 | | | 71 | 92 | 113 | 134 | 155 | 176 | 197 | 214 | 227 | |
| 1HL | 31 | 6 | | | 70 | 91 | 112 | 133 | 154 | 175 | 196 | 213 | 226 | |
| 1HL | 30 | 5 | | | 69 | 90 | 111 | 132 | 153 | 174 | 195 | 212 | 225 | |
| 1HL | 29 | 4 | | | 68 | 89 | 110 | 131 | 152 | 173 | 194 | 211 | 224 | |
| 1HL | 28 | 3 | | | 67 | 88 | 109 | 130 | 151 | 172 | 193 | 210 | 223 | |
| 1HL | 27 | 2 | | | 66 | 87 | 108 | 129 | 150 | 171 | 192 | 209 | 222 | |
| 1HL | 26 | 1 | | | 65 | 86 | 107 | 128 | 149 | 170 | 191 | 208 | 221 | |
| 1HL | 25 | 0 | | | 64 | 85 | 106 | 127 | 148 | 169 | 190 | 207 | 220 | |
| 2HH | 7 | 3 | | 15 | 63 | 84 | 105 | 126 | 147 | 168 | 189 | 206 | 219 | |
| 2HH | 6 | 2 | | 14 | 62 | 83 | 104 | 125 | 146 | 167 | 188 | 205 | 218 | |
| 2HH | 5 | 1 | | 13 | 61 | 82 | 103 | 124 | 145 | 166 | 187 | 204 | 217 | |
| 2HH | 4 | 0 | | 12 | 60 | 81 | 102 | 123 | 144 | 165 | 186 | 203 | 216 | |
| 2LH | 7 | 3 | | 15 | 23 | 59 | 80 | 101 | 122 | 143 | 164 | 185 | 202 | |
| 2LH | 6 | 2 | | 14 | 22 | 58 | 79 | 100 | 121 | 142 | 163 | 184 | 201 | |
| 2LH | 5 | 1 | | 13 | 21 | 57 | 78 | 99 | 120 | 141 | 162 | 183 | 200 | |
| 2LH | 4 | 0 | | 12 | 20 | 56 | 77 | 98 | 119 | 140 | 161 | 182 | 199 | |
| 2HL | 7 | 3 | | 15 | 63 | 59 | 80 | 101 | 122 | 143 | 164 | 185 | 202 | |
| 2HL | 6 | 2 | | 14 | 62 | 58 | 79 | 100 | 121 | 142 | 163 | 184 | 201 | |
| 2HL | 5 | 1 | | 13 | 61 | 57 | 78 | 99 | 120 | 141 | 162 | 183 | 200 | |
| 2HL | 4 | 0 | | 12 | 20 | 56 | 77 | 98 | 119 | 140 | 161 | 182 | 190 | |
| 2LL | 3 | 3 | | 11 | 19 | 27 | 55 | 76 | 97 | 118 | 139 | 160 | 181 | |
| 2LL | 2 | 2 | | 10 | 18 | 26 | 54 | 75 | 96 | 117 | 138 | 159 | 180 | |
| 2LL | 1 | 1 | | 9 | 17 | 25 | 53 | 74 | 95 | 116 | 137 | 158 | 179 | |
| 2LL | 0 | 0 | | 8 | 16 | 24 | 52 | 73 | 94 | 115 | 136 | 157 | 178 | |

Sub-bit plane columns for each Code Of Bit: Significant / Refinement / Cleanup

IMAGE PROCESSING APPARATUS, IMAGE COMPRESSION APPARATUS, IMAGE PROCESSING METHOD, IMAGE COMPRESSION METHOD, PROGRAM, AND RECORDING MEDIUM

The present application claims priority to the corresponding Japanese Application No. 2003-037919 filed on Feb. 17, 2003, the entire contents of which are hereby incorporated by reference.

BACKGROUND OF THE INVENTION

1. Field of the Invention

The present invention relates to an image processing apparatus, an image compression apparatus, an image processing method, an image compression method, a program, and a recording medium.

2. Description of the Related Art

In recent years and continuing, there is considerable spread in the use of images with high fineness. This is largely due to input devices (e.g., digital still cameras, scanners) and output devices (e.g., inkjet printers, displays) serving to handle very fine images. Among algorithms handling still images of high fineness, JPEG (Joint Photographic Experts Group) is, at present, most widely used. In eliminating the redundancy of spatial areas, JPEG employs a two-dimensional discrete cosine transform.

A basic function of this transform type is merely to compress and decompress still images. The JPEG type is neither able to manipulate images in a compressed state or view a particular area during decompression. In addition, the JPEG type handles an image as a flat structure that has no hierarchy. Accordingly, encoded data must be completely decoded in order to perform a new process on an image.

With the JPEG algorithm, as fineness of an image gets higher or the scale of an image gets larger, that is, as the number of pixels of an original image increases, the time required for decompressing the encoded image and displaying the image on a display device will also increase. Such an increase has reached a level that it can no longer be ignored since that fineness and area of an original have increased due to the improvements in the performance of recent input devices. It is also a concern for areas related to handling of satellite/aerial photographs or medical/scientific images, and areas related to recording images of cultural assets. It is to be noted that the time required in decompressing a JPEG compressed image has a characteristic of being a certain value having no relation to the compression ratio. This is due to the fact that JPEG compressed data must be completely decoded regardless of compression ratio.

Generally, displaying all pixels of a large image is difficult in that there is a restriction on the number of pixels that can be displayed on a display device. This is, therefore, actually dealt with by reducing the image on the display. Nevertheless, even in displaying a reduced image with a conventional JPEG algorithm, it is necessary to obtain every pixel value by decompressing the entire original image, and then conduct a pixel skipping process. The decompression time for obtaining every pixel value of the original image increases in proportion to the number of pixels of the image. Although the time may also depend on the performance of the CPU or the capacity of the memory, it takes, for example, several minutes to several tens of minutes until the image is displayed.

With the conventional JPEG algorithm, even in a case where sufficient information can be obtained without conducting a complete decoding process, such complete decoding process is necessary, and it is impossible to designate an image area targeted for decompression or an order (sequence) for performing decompression in a decompression process. The conventional JPEG algorithm has difficulty in meeting the needs such as displaying a color image with a gray scale image, viewing only a certain area of an image, viewing an image in a thumbnail size, accessing image contents at high speed, or viewing a fast forward display of a motion image. With the JPEG algorithm, first, image data are generated by performing a complete decompression process on encoded data of an original image. Then, a desired image is obtained by transforming the generated image data into, for example, image data for gray-scale display, image data for display of a particular area, or image data for thumbnail display.

Meanwhile, images are often displayed in thumbnail form by image display apparatuses. As for conventional techniques of displaying in thumbnail form, there are, for example, a method of decompressing an entire image and setting an appropriate resolution for the image, or a method of separately storing a thumbnail image. In any of such techniques, compression/decompression of an image is conducted by using basic functions of the JPEG standard or in some cases expanded functions. It is to be noted that a thumbnail image is an image that is output (e.g., displayed, printed, and/or transmitted) in a condensed form of a desired code size.

Nevertheless, a large amount of time is required for outputting (e.g. displaying, printing, and/or transmitting) a thumbnail image in a case of employing a thumbnail outputting method conducted by decompressing an entire image and setting a suitable resolution for the image.

In a case of employing a thumbnail outputting method conducted by separately storing a thumbnail image, data of a thumbnail image (small-sized image) itself are generally stored in a header portion of compressed data of a main image, as with, for example, Exif (Exchangeable image file format). Although this method is able to increase output speed, this method requires large storage capacity for compressed data.

SUMMARY OF THE INVENTION

An image processing apparatus, image compression apparatus, image processing method, image compression method, program, and recording medium are described. In one embodiment, the image processing apparatus for generating data to be used for image processing comprises a dividing unit to divide code data of a compressed image into a plurality of segments, a code size computing unit to compute a code size corresponding to each of the plurality of segments, and a memory unit to store the corresponding relation between the code size and each of the plurality of segments.

BRIEF DESCRIPTION OF THE DRAWINGS

FIG. 2 is a sequence of diagrams for illustrating an algorithm of a JPEG 2000 scheme;

FIG. 6 is a table showing an example of packets and layers in a case where the number of the decomposition levels is 2 (resolution level=3), in which an example of a typical layer structure is illustrated;

FIG. 7 is a table showing an example of packets and layers in a case where the number of the decomposition levels is 2 (resolution level=3), in which an example of a layer structure is able to output thumbnails according to respective apparatuses is illustrated;

FIG. 8 is a table showing an example of packets and layers in a case where the number of the decomposition levels is 2 (resolution level=3), in which an example of a layer structure is able to output thumbnails according to the capacity of a transmission line is illustrated;

DESCRIPTION OF THE PREFERRED EMBODIMENTS

Figure 1:
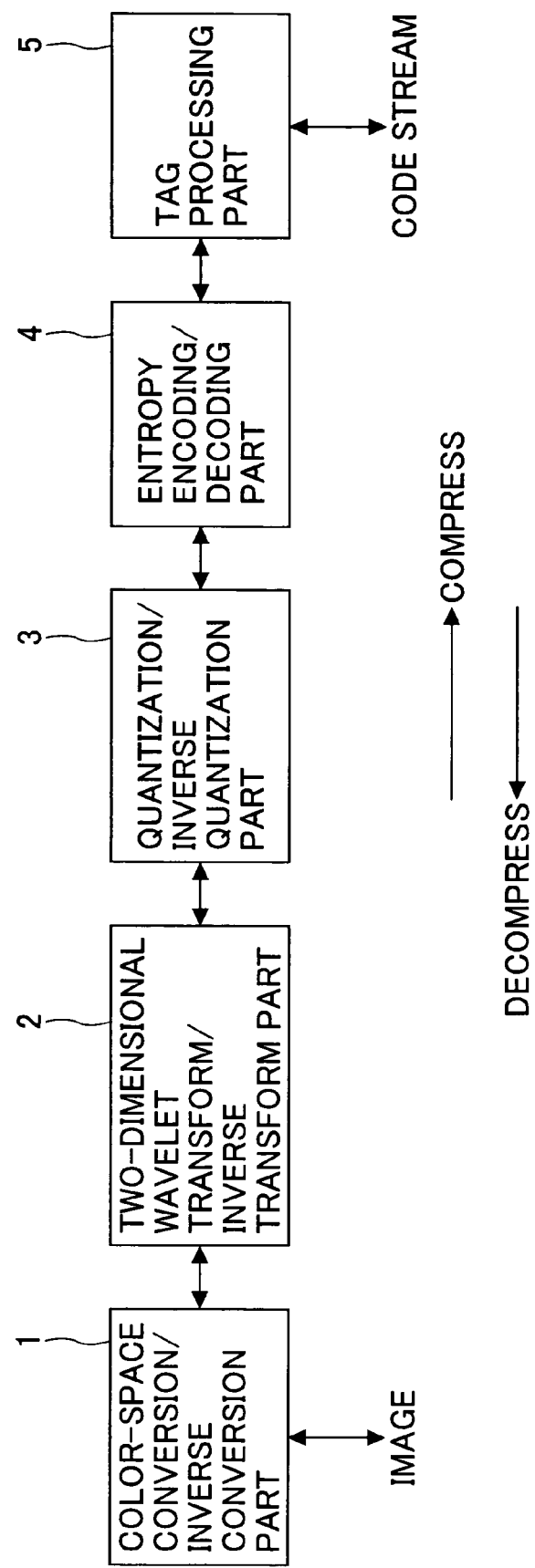
FIG. 1 is a block diagram for illustrating the hierarchical encoding/decoding algorithm serving as a base of a JPEG 2000 scheme.
Figure 3A:
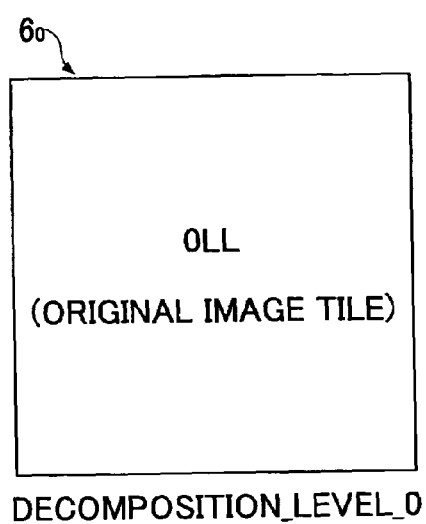
FIGS. 3A through 3D is a set of schematic diagrams showing sub-bands for each decomposition level in a case where the number of the decomposition levels is 3.
Figure 3B:
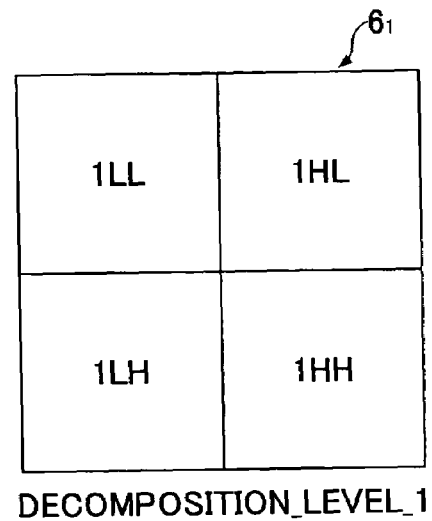
Figure 3C:
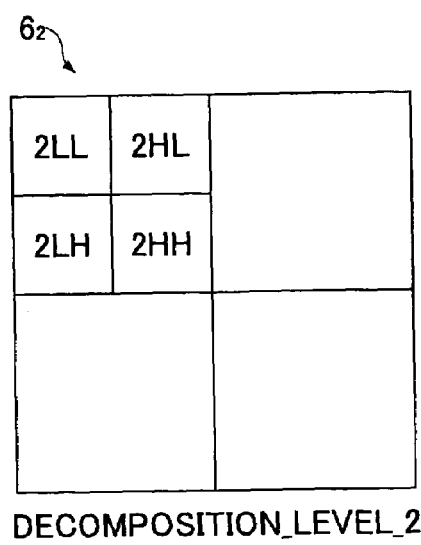
Figure 3D:
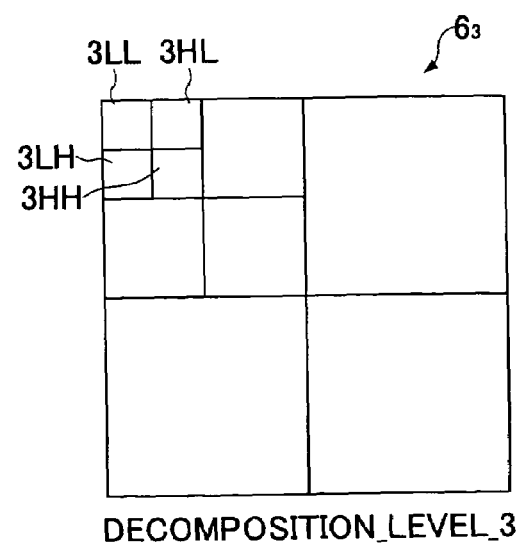

In order to solve the difficulty described above, the applicant of the present application proposes herein embodiments of the present inventions related to a code stream forming apparatus, an image decompression system using such apparatus, an image decompression apparatus, an image providing system, a code stream forming method, an image decompression method, a computer readable program, and a computer readable recording medium having such program recorded thereto that can reduce the decompression time required for displaying compressed data, that is, a code stream forming apparatus, an image decompression system using such an apparatus, an image decompression apparatus, an image providing system, a code stream forming method, an image decompression method, a computer readable program, and a computer readable recording medium having such program recorded thereto, which serve to provide a code stream of still images that allows data of very fine images, having been encoded as still images or a moving image formed of a sequence of still images, to be displayed at high speed and in a size-reduced manner. The code stream forming function of the aforementioned inventions enables efficient image decompression by designating an area targeted for decompression or the order of conducting a decompression process. That is, such function allows a decompression procedure to be specified.

The aforementioned technologies proposed by the inventor of the present invention are examples that are applied with the expanded functions.

One or more embodiments of the present invention include an image processing apparatus, an image compression apparatus, an image processing method, an image compression method, a program, and a computer-readable recording medium that substantially obviate one or more of the problems caused by the limitations and disadvantages of the related art.

Features and advantages of embodiments of the present invention are set forth in the description that follows, and in part will become apparent from the description and the accompanying drawings, or may be learned by practice of the invention according to the teachings provided in the description. Embodiments as well as other features and advantages of the present invention will be realized and attained by an image processing apparatus, an image compression apparatus, an image processing method, an image compression method, a program, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the invention includes an image compression apparatus for generating data to be used for image processing, the image processing apparatus including: a dividing unit dividing code data of a compressed image into a plurality of segments; a code size computing unit computing a code size corresponding to each of the plurality of segments; and a memory unit storing the corresponding relation between the code size and each of the plurality of segments.

According to the image processing apparatus in an embodiment of the present invention, the plurality of segments may be a plurality of image quality levels.

According to the image processing apparatus in an embodiment of the present invention, the image quality level may be a layer.

According to the image processing apparatus in an embodiment of the present invention, the plurality of segments may be a plurality of rectangular domains.

According to the image processing apparatus in an embodiment of the present invention, the dividing unit may include a unit that divides the code data into the plurality of rectangular domains based on a tile, a precinct, or a code block.

According to the image processing apparatus in an embodiment of the present invention, the plurality of segments may be a plurality of color components.

According to the image processing apparatus in an embodiment of the present invention, the plurality of segments may be a plurality of resolution levels.

According to the image processing apparatus in an embodiment of the present invention, the plurality of segments may be a plurality of packets.

Furthermore, an embodiment of the present invention includes an image processing apparatus for generating data to be used for image processing, where the image processing apparatus includes: a code size setting unit setting one or more code sizes; an image quality level computing unit computing an image quality level matching with the set one or more code sizes; a dividing unit dividing code data of a compressed image into a plurality of image quality levels; a code size computing unit computing a code size corresponding to each of the plurality of image quality levels; and a memory unit storing the corresponding relation between the code size and each of the plurality of image quality levels.

According to the image processing apparatus in an embodiment of the present invention, the code size setting unit may set one or more code sizes based on the type of transmission line, the capacity of a transmission line, the type of an image display apparatus, the display resolution of an image display apparatus, or the process speed of an image display apparatus.

Furthermore, an embodiment of the present invention includes an image compression apparatus for generating compressed code data of an image, where the image compression apparatus includes: a dividing unit dividing code data of a compressed image into a plurality of segments; a code size computing unit computing a code size corresponding to each of the plurality of segments; and an embedding unit embedding the corresponding relation between the code size and each of the plurality of segments into the code data.

According to the image compression apparatus in an embodiment of the present invention, the plurality of segments may be a plurality of image quality levels.

According to the image compression apparatus in an embodiment of the present invention, the image quality level may be a layer.

According to the image compression apparatus in an embodiment of the present invention, the plurality of segments may be a plurality of rectangular domains.

According to the image compression apparatus in an embodiment of the present invention, the dividing unit may include a unit that divides the code data into the plurality of rectangular domains based on a tile, a precinct, or a code block.

According to the image compression apparatus in an embodiment of the present invention, the plurality of segments may be a plurality of color components.

According to the image compression apparatus in an embodiment of the present invention, the plurality of segments may be a plurality of resolution levels.

According to the image compression apparatus in an embodiment of the present invention, the plurality of segments may be a plurality of packets.

Furthermore, an embodiment of the present invention includes an image compression apparatus for generating compressed code data of an image, where the image compression apparatus includes: a code size setting unit setting one or more code sizes; an image quality level computing unit computing an image quality level matching with the set one or more code sizes; a dividing unit dividing code data of a compressed image into a plurality of image quality levels; a code size computing unit computing a code size corresponding to each of the plurality of image quality levels; and an embedding unit embedding the corresponding relation between the code size and each of the plurality of image quality levels into the code data.

According to the image compression apparatus in an embodiment of the present invention, the code size setting unit may set one or more code sizes based on the type of transmission line, the capacity of a transmission line, the type of an image display apparatus, the display resolution of an image display apparatus, or the process speed of an image display apparatus.

According to the image compression apparatus in an embodiment of the present invention, the image quality level may be a layer.

According to the image compression apparatus in an embodiment of the present invention, the image processing apparatus may further include: a desired-code size setting unit setting a desired code size; and a modifying unit modifying the code data to the desired code size based on the corresponding relation stored in the memory unit.

According to the image compression apparatus in an embodiment of the present invention, the image processing apparatus may further include: a location computing unit computing a truncation location matching with the set desired code size based on the corresponding relation stored in the memory unit; and a location information memory unit storing information of the computed truncation location.

Furthermore, an embodiment of the present invention includes an image processing apparatus for processing the code data of the image compression apparatus, where the image processing apparatus includes: a desired-code size setting unit setting a desired code size; and a modifying unit modifying the code data to the desired code size based on the corresponding relation embedded into the code data.

According to the image processing apparatus in an embodiment of the present invention, the image processing apparatus may further include: a location computing unit computing a truncation location matching with the set desired code size based on the corresponding relation embedded into the code data; and a location information memory unit storing information of the computed truncation location.

Furthermore, one embodiment of the present invention includes an image processing method for generating data to be used for image processing, where the image processing method includes: a) dividing code data of a compressed image into a plurality of segments; b) computing a code size corresponding to each of the plurality of segments; and c) storing the corresponding relation between the code size and each of the plurality of segments.

According to the image processing method in an embodiment of the present invention, the plurality of segments may be a plurality of image quality levels.

According to the image processing method in an embodiment of the present invention, the image quality level may be a layer.

According to the image processing method in an embodiment of the present invention, the plurality of segments may be a plurality of rectangular domains.

According to the image processing method in an embodiment of the present invention, the dividing unit may include a unit that divides the code data into the plurality of rectangular domains based on a tile, a precinct, or a code block.

According to the image processing method in an embodiment of the present invention, the plurality of segments may be a plurality of color components.

According to the image processing method in an embodiment of the present invention, the plurality of segments may be a plurality of resolution levels.

According to the image processing method in an embodiment of the present invention, the plurality of segments may be a plurality of packets.

Furthermore, one embodiment of the present invention includes an image processing method for generating data to be used for image processing, where the image processing method includes: a) setting one or more code sizes; b) computing an image quality level matching with the set one or more code sizes; c) dividing code data of a compressed image into a plurality of image quality levels; d) computing a code size corresponding to each of the plurality of image quality levels; and e) storing the corresponding relation between the code size and each of the plurality of image quality levels.

According to the image processing method in an embodiment of the present invention, operation a) may set one or more code sizes based on the type of transmission line, the capacity of a transmission line, the type of an image display apparatus, the display resolution of an image display apparatus, or the process speed of an image display apparatus.

Furthermore, an embodiment of the present invention includes an image compression method for generating compressed code data of an image, where the image compression method includes: a) dividing code data of a compressed image into a plurality of segments; b) computing a code size corresponding to each of the plurality of segments; and c) embedding the corresponding relation between the code size and each of the plurality of segments into the code data.

According to the image compression method in an embodiment of the present invention, the plurality of segments may be a plurality of image quality levels.

According to the image compression method in an embodiment of the present invention, the image quality level may be a layer.

According to the image compression method in an embodiment of the present invention, the plurality of segments may be a plurality of rectangular domains.

According to the image compression method in an embodiment of the present invention, operation a) may include a step of dividing the code data into the plurality of rectangular domains based on a tile, a precinct, or a code block.

According to the image compression method in an embodiment of the present invention, the plurality of segments may be a plurality of color components.

According to the image compression method in an embodiment of the present invention, the plurality of segments may be a plurality of resolution levels.

According to the image compression method in an embodiment of the present invention, the plurality of segments may be a plurality of packets.

Furthermore, one embodiment of the present invention includes an image compression method for generating compressed code data of an image, where the image compression method includes: a) setting one or more code sizes; b) computing an image quality level matching with the set one or more code sizes; c) dividing code data of a compressed image into a plurality of image quality levels; d) computing a code size corresponding to each of the plurality of image quality levels; and e) embedding the corresponding relation between the code size and each of the plurality of image quality levels into the code data.

According to the image compression method in an embodiment of the present invention, operation a) may set one or more code sizes based on the type of transmission line, the capacity of a transmission line, the type of an image display apparatus, the display resolution of an image display apparatus, or the process speed of an image display apparatus.

According to the image compression method in an embodiment of the present invention, the image quality level may be a layer.

According to the image processing method in an embodiment of the present invention, the image processing method may further include: d) setting a desired code size; and e) modifying the code data to the desired code size based on the corresponding relation stored in the memory unit.

According to the image processing method in an embodiment of the present invention, the image processing method may further include: f) computing a truncation location matching with the set desired code size based on the corresponding relation stored in operation c); and g) storing information of the computed truncation location.

According to the image processing method in another embodiment of the present invention, the image processing method may further include: f) setting a desired code size; and g) modifying the code data to the desired code size based on the corresponding relation stored in operation e).

According to the image processing method in another embodiment of the present invention, the image processing method may further include: h) computing a truncation location matching with the set desired code size based on the corresponding relation stored in operation e); and i) storing information of the computed truncation location.

Furthermore, the present invention includes an image processing method for processing the code data of the image compression method according to an embodiment of the present invention, the image processing method including: a) setting a desired code size; and b) modifying the code data to the desired code size based on the corresponding relation embedded into the code data.

According to the image processing method in an embodiment of the present invention, the image processing method may further include: c) computing a truncation location matching with the set desired code size based on the corresponding relation embedded into the code data; and d) storing information of the computed truncation location.

Furthermore, the present invention includes a program for causing a computer to function as the image processing apparatus according to an embodiment of the present invention.

Furthermore, the present invention includes a program for causing a computer to function as the image compression apparatus according to an embodiment of the present invention.

Furthermore, the present invention includes a program for causing a computer to execute the image processing method according to an embodiment of the present invention.

Furthermore, the present invention includes a program for causing a computer to execute the image compression method according to an embodiment of the present invention.

Furthermore, the present invention includes a computer-readable recording medium for recording therein the program according to an embodiment of the present invention.

It is another and more specific embodiment of the present invention to include an image processing apparatus, an image compression apparatus, an image processing method, an image compression method, a program, and a computer-readable recording medium for increasing the speed of a transformation process conducted in accordance with a targeted output medium by generating a corresponding relation for generating compressed data that allows high speed output of thumbnail images without increasing the requirement for compression data storage capacity.

It is another and more specific embodiment of the present invention to include an image processing apparatus, an image compression apparatus, an image processing method, an image compression method, a program, and a computer-readable recording medium for changing compressed data or generating information for changing compressed data according to a corresponding relation generated for generating compressed data that allows high speed output of thumbnail images without increasing the requirement for compression data storage capacity.

Other embodiments and further features of the present invention will become apparent from the following detailed description when read in conjunction with the accompanying drawings.

In the following, embodiments of the present invention are described with reference to the accompanying drawings.

Encoded data that are processed in the embodiment of the present invention explained below are encoded data (hereinafter also referred to as compressed data) of a still image of JPEG 2000 (ISO/IEC FCD 15444-1), and encoded data of a moving picture of Motion-JPEG 2000 (ISO/IEC FCD 15444-3). In Motion-JPEG 2000, the moving picture is realized by a series of continuous still images, each image serving as a frame, and the encoded data of each frame are based on JPEG 2000, with the only difference being the file format, which differs from JPEG 2000 in part.

JPEG 2000 is an image compression/decompression method chosen as an international standard in 2001 as a successor of JPEG. Details of the algorithm of JPEG 2000 are available from published books, such as "Next-generation Image Coding System JPEG 2000" by Yasuyuki Nomizu (Triceps, Inc.).

FIG. 1 is a block diagram for illustrating an algorithm of hierarchical encoding/decoding with JPEG 2000, and is also a block diagram serving to explain an image processing apparatus according to an embodiment of the present invention.

The algorithm of JPEG 2000 is configured by a two-dimensional wavelet transform portion 2, a quantization portion 3, an entropy coding portion 4, and a tag processing portion 5. The two-dimensional wavelet transformation portion 2, the quantization portion 3, and the entropy coding portion 4 serve to process data that are input/output from/to a color space conversion portion (color conversion portion) 1 and also data input/output from/to the tag processing portion 5. The portions may be arranged in a reverse direction. Further, the process conducted by each of the portions may be performed on data of each component of a targeted image.

FIG. 2 is a simplified diagram showing a flow of the algorithm of JPEG 2000. In a compression process, each component of image data is subjected to color space conversion in step S2. Then, a wavelet transformation is performed on each of the components to obtain wavelet coefficients (step S3). Then, the coefficients of the wavelets are subjected to progressive-sub-bit-plane encoding (quantization) (step S4) and then entropy encoding (step S5). On the other hand, in a decompression process, wavelet coefficients for each component obtained from entropy decoding (step S5) and inverse quantization (step S4) are subjected to an inverse wavelet transformation (step S3) followed by inverse color conversion (step S2), to thereby return to the original RGB image as shown in step SI.

Next, the algorithm of JPEG 2000 is described in detail.

In comparison with the conventional JPEG algorithm, one of the most significant differences is the method of transformation. While a DCT (Discrete Cosine Transform) method is applied to the conventional JPEG, a DWT (Discrete Wavelet Transform) method is applied to the hierarchical coding algorithm of JPEG 2000. The DWT method, in comparison with the DCT method, is advantageous in that high quality images can be provided in areas compressed at high levels. This is one major reason for employing the DWT method in the JPEG 2000 algorithm that serves as a successor of the JPEG algorithm. As another significant difference, a functional block referred to as the "tag processing unit 5" is added for executing code formation at the final stage of the system. In the tag processing unit 5, compressed data are generated in the form of code stream data during an image compression process, and code stream data required to be decompressed are interpreted during a decompression process. By using the code stream data, JPEG 2000 is able to provide a variety of useful functions. Other than being able to provide satisfactory image quality under high compression rate (low bit rate), the algorithm of JPEG 2000 has many other useful features.

One of the JPEG 2000 features is being able to adjust the amount of the encoded data without performing recompression by post-quantization by discarding (truncation) of codes of the encoded data. The code discarding (truncation) can be performed in various units, such as domains of tiles, precincts, components, decomposition levels (or resolution levels), bit planes, sub-bit planes, packets, and layers in the case of a multi-layer structure.

For example, FIG. 3 shows sub-bands in each decomposition level in a case of three decomposition levels. The process of compressing/decompressing still images can be stopped at a given level subjected to octave division in which an image is divided in a block basis by performing DWT as shown in FIG. 3. As for the relations between decomposition levels and resolution levels, the resolution level is 0 with respect to sub-band 3LL, the resolution level is 1 with respect to sub-bands 3HL, 3LH, 3HH, the resolution level is 2 with respect to sub-bands 2HL, 2LH, 2HH, and the resolution level is 3 with respect to sub-bands 1HL, 1LH, and HH. According to "JPEG 2000 Part 1, FDIS (Final Draft International Standard)," the term "decomposition level" is defined as follows:

"A collection of wavelet subbands where each coefficient has the same spatial impact or span with respect to the source component samples. These include the HL, LH and HH subbands of the same two-dimensional subband decomposition. For the last decomposition level the LL subband is also included."

Another JPEG 2000 feature is being able to restructure the layer of the encoded data under a code state, that is, the encoded data as they are. Another feature is being able to restructure the encoded data of a certain progression sequence to encoded data of another progression sequence under the code state. Further, another feature is being able to divide the encoded data of a multi-layer structure into two or more sets of encoded data in units of layers under the code state.

Next, the algorithm of JPEG 2000 is further described in detail step by step.

In many cases, the color-space transformation/inverse transformation unit 1 (as shown in FIG. 1) is connected to an input/output unit for an original image. The color-space transformation/inverse transformation unit 1 performs color-space transformation/inverse transformation, for example, transformation/inverse transformation from an RGB color expression system (comprising primary color components of Red (R), Green (G), and Blue (B)) or a YMC color expression system (comprising complementary color components of Yellow (Y), Magenta (M), and Cyan (C)) to a YUV or YCbCr color expression system.

Figure 4:
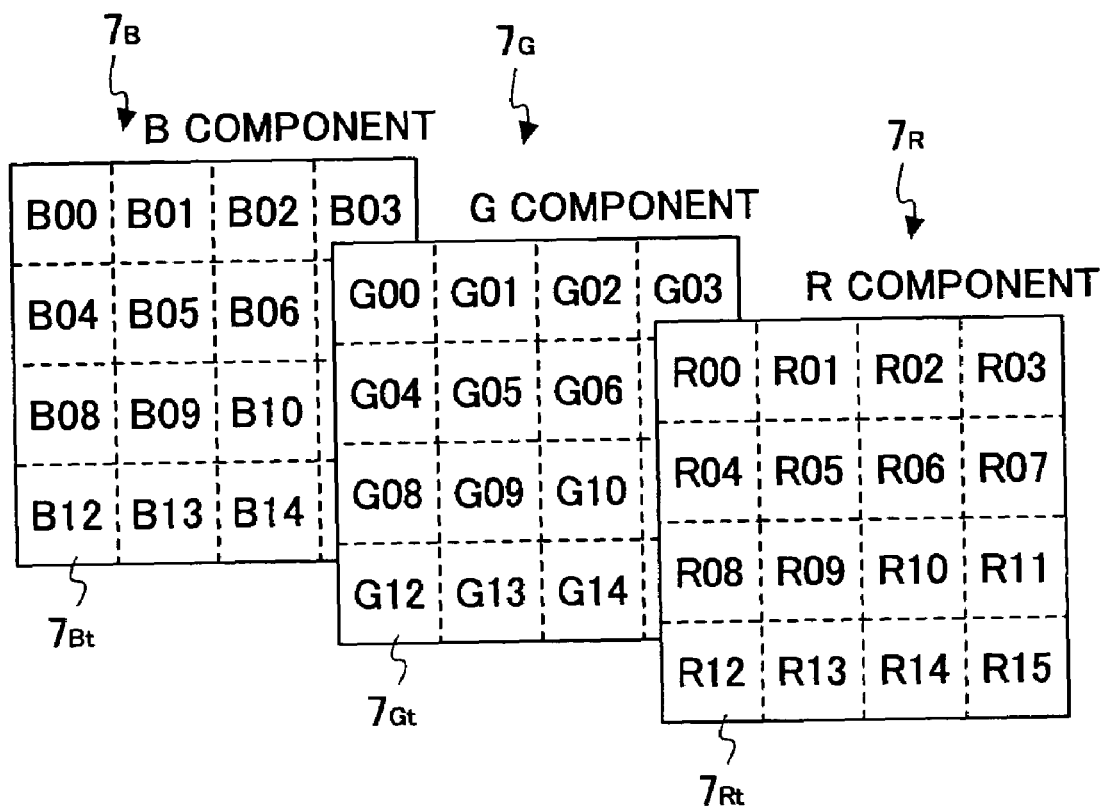
FIG. 4 is a set of schematic diagram showing an example of each component of a color image divided into tiles.

FIG. 4 is a diagram for illustrating an example of components of an original image divided into tiles.

Generally, with color images, components $7_R$, $7_G$, $7_B$ (in this embodiment, components of an RGB color expression system) of an original image are divided into respective rectangular domains (tiles) $7_{Rt}$, $7_{Gt}$, $7_{Bt}$ in a manner shown in FIG. 4. Each of the tiles (in the example shown in FIG. 4, R00, R01, ..., R15/G00, G01, ..., G15/B00, B01, ..., B15) serves as a basic unit on which an image data compression/decompression operation is conducted. Accordingly, components of image data (image data of each frame in a case of processing moving pictures) targeted for compression/decompression are divided into rectangular domains that are not overlapped (referred to as tiles) and are processed in tile units. That is, the image data compression/decompression operation is conducted independently for each component and each tile. However, it is also possible to allow the tile size to be the same as the size of the image. That is, it is also possible not to conduct such tile division.

In an image data encoding operation, image data of each tile of each component are input to the color-space conversion/inverse conversion unit 1 (see FIG. 1), at which color-space conversion is performed. Subsequent to the color-space conversion, the image data are subjected to two-dimensional wavelet transformation in the two-dimensional wavelet transformation/inverse transformation unit 2, and are spatially divided into frequency bands. It is to be noted that this color space conversion may be skipped.

FIG. 3 shows sub-bands in each decomposition level in a case where the number of decomposition levels is 3. That is, an original image tile (0 LL) (decomposition level 0 ($6_0$)) is decomposed by the two-dimensional wavelet transform, into sub-bands of decomposition level 1 ($6_1$), namely, 1LL, 1HL, 1LH, and 1HH. That is, the original image tile ($6_0$) is divided into the sub-bands shown on decomposition level 1 ($6_1$). Then, the low frequency sub-band 1LL on decomposition level 1 is subjected to two-dimensional wavelet transformation to be further decomposed into sub-bands, namely, 2LL, 2HL, 2LH, and 2HH on decomposition level 2 ($6_2$). Similarly, the low frequency sub-band 2LL is subjected to two-dimensional wavelet transformation to be further decomposed into sub-bands, namely, 3LL, 3HL, 3LH, and 3HH on decomposition level 3 ($6_3$). Here, taking all of the decomposition levels, the sub-bands targeted for encoding are sub-bands 3HL, 3LH, 3HH, 2HL, 2LH, 2HH, 1HL, 1LH, and 1HH, in a case of, for example, three decomposition levels. In this case, sub-band 3LL is not targeted for encoding.

Next, bits targeted for encoding are determined in a prescribed encoding sequence for allowing the quantization unit 3 (shown in FIG. 1) to generate a context from the bits surrounding the encoding targeted bits. That is, the coefficients of the wavelets obtained by recursive division (octave division) of a low frequency component (LL sub-band coefficient), as described above, are quantized for every sub-band in the quantization unit 3. In JPEG 2000, both "lossless" (reversible) compression and "lossy" (irreversible) compression are possible. If lossless compression is carried out, quantization step width is always set at 1, and the data are not quantized at this stage. The wavelet coefficients that have been quantized, for example, increase to 12 bits with respect to 8 bits in the original image.

After quantization, in the entropy encoding unit, the tiles of each component are encoded by probability estimation in accordance with context and encoding targeted bits. Thereby, entropy encoding of each sub-band coefficient is carried out. As for the entropy encoding, a coding system called EBCOT (Embedded Block Coding with Optimized Truncation) is used, which includes block division, coefficient modeling, and binary arithmetic coding. A bit plane of each sub-band coefficient after quantization is encoded for every block (called "code block") from a higher rank plane to a lower rank plane.

In the tag processing unit 5, a code generating process is conducted. In the code generating process, the encoded data from the entropy encoding unit 4 are combined into a single code stream, and tag information is added thereto. In the tag processing unit 5, packets are generated by collecting codes of the code blocks generated in the entropy encoding unit 4. The generated packets are put in order according to a sequence of progression (progression sequence), and tag information is added, such that encoded data in a predetermined format are generated. As for the sequence control, the progression sequence of JPEG 2000 is defined by, for example, a resolution level, a precinct (position), a layer, and a component (color composition).

Next, the entropy encoding process in the entropy coding unit 4 and the code generating process in the tag processing unit 5 are described in detail.

Wavelet coefficients having undergone the quantization process are divided into non-overlapped rectangles referred to as "precincts" for each sub-band. This is introduced in order to efficiently use memory during an implementation process. Further, each precinct is divided into non-overlapped rectangular "code blocks."

Here, a brief explanation is presented about the precinct, the code block, the packet, and the layer. The following size relations exist: image>=tile>=sub-band>=precinct>=code bock.

Figure 9:
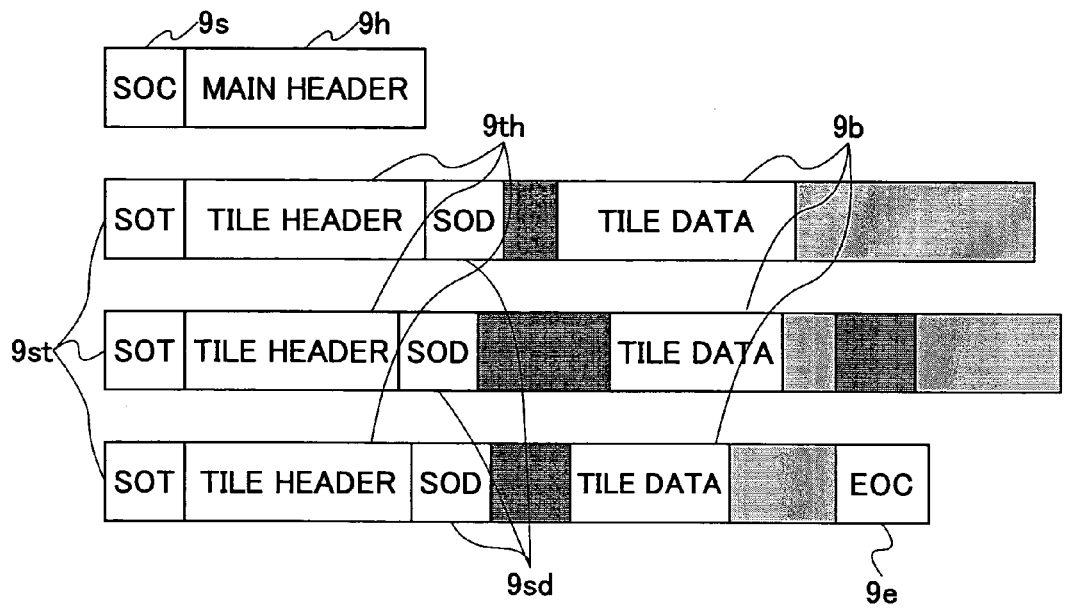
FIG. 9 is a data diagram showing a format of code data (code stream structure) of JPEG 2000 that is generated from a code generating process.

A precinct is one or more rectangular domains of sub-bands. A group of three domains of sub-bands HL, LH, and HH belonging to the same decomposition level and having the same relative spatial position, are treated as a precinct. In the case of the LL sub-band, however, one domain alone is treated as a precinct. Here, it is also possible to make the size of the precinct be the same size as the sub-band. Further, a rectangular domain that is a division of a precinct is a code block. The packet is a collection (assembly) of parts of codes (for example, the codes of three sheets of the bit planes, i.e., from MSB to the third bit) of all the code blocks of the precinct. An empty packet is also allowed. Packets are generated by collecting the codes of the code blocks, and are arranged in a desired progression sequence, such that encoded data are generated. With reference to FIG. 9, the portion that follows SOD of each tile header represents a set of the packets.

A layer is generated by collecting the packets of all the precincts (that is, all the code blocks, and all the sub-bands); the layer is a part of codes of the entire image region (for example, codes of the highest tier bit plane through codes of the third tier bit plane of the wavelet coefficients of the entire image region). However, it is not necessary that the layer include the packets of all the precincts, as described later. Accordingly, where there are a larger number of layers that are decoded at the time of decompression, a higher quality image can be reproduced. Accordingly, the layer serves as a unit for representing image quality. If all the layers are collected, the codes of all the bit planes of the entire image region are obtained.

Figure 5:
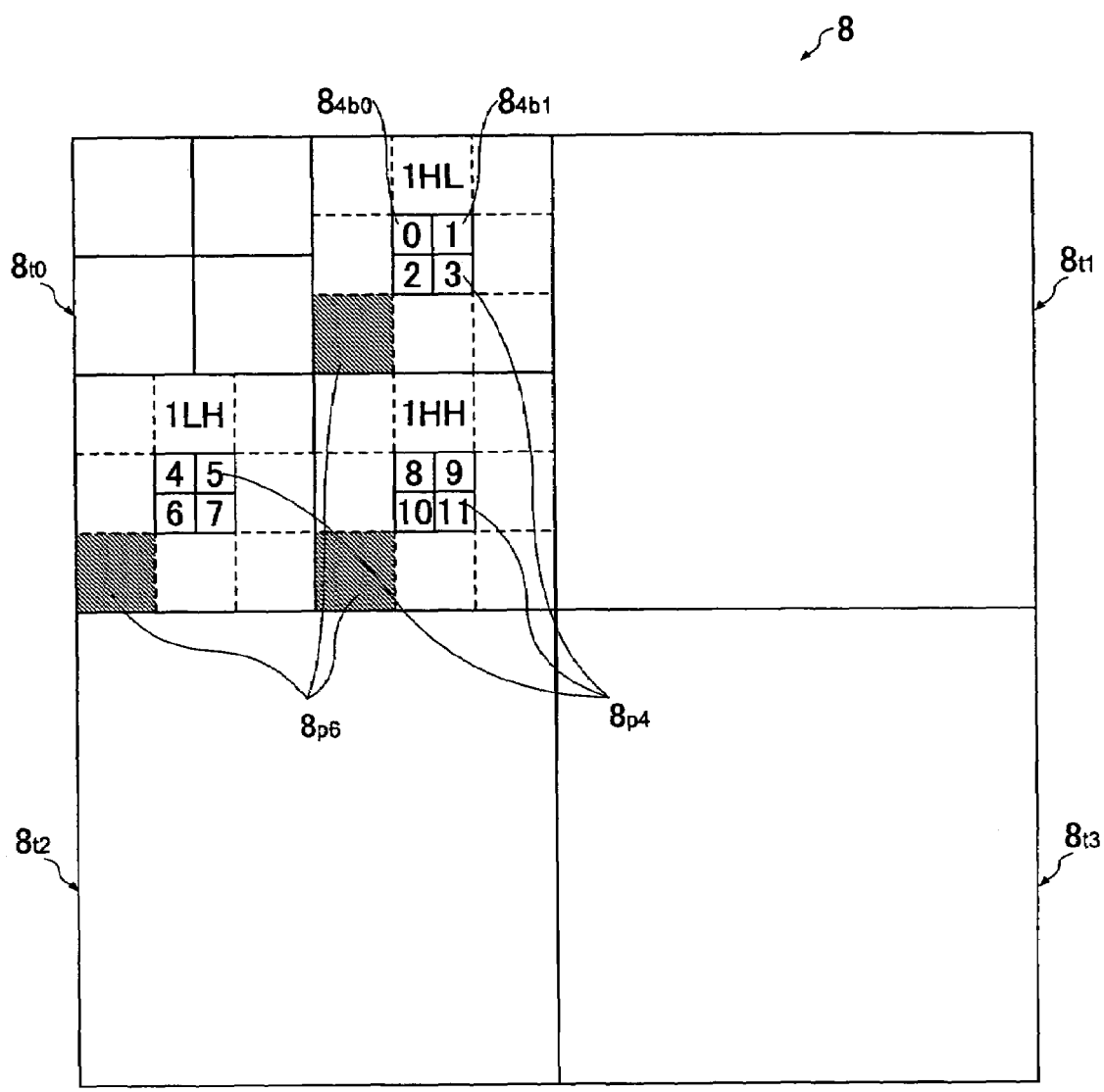
FIG. 5 is a schematic diagram showing a relation between precincts and code blocks.
Figure 7:
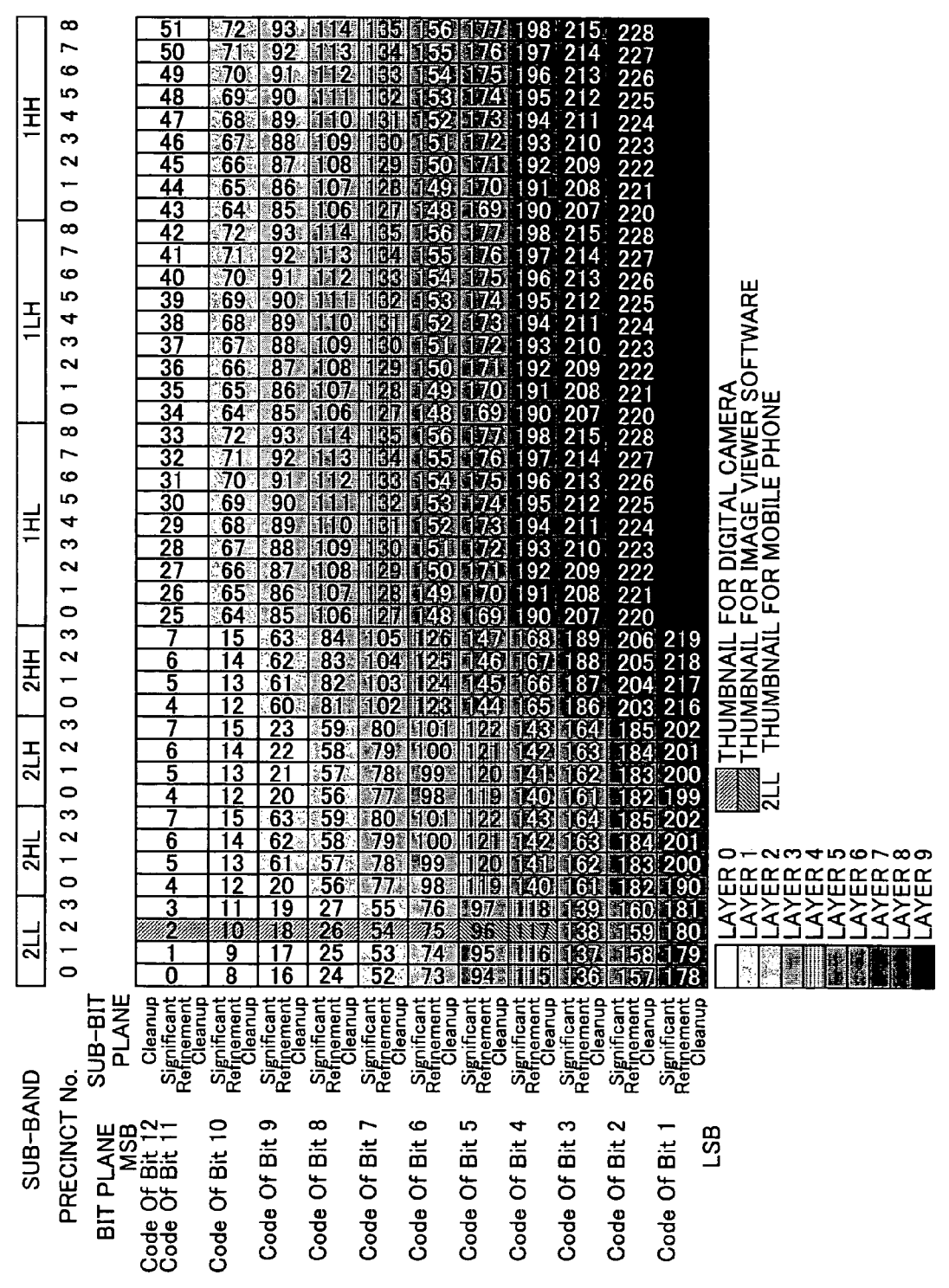
Figure 8:
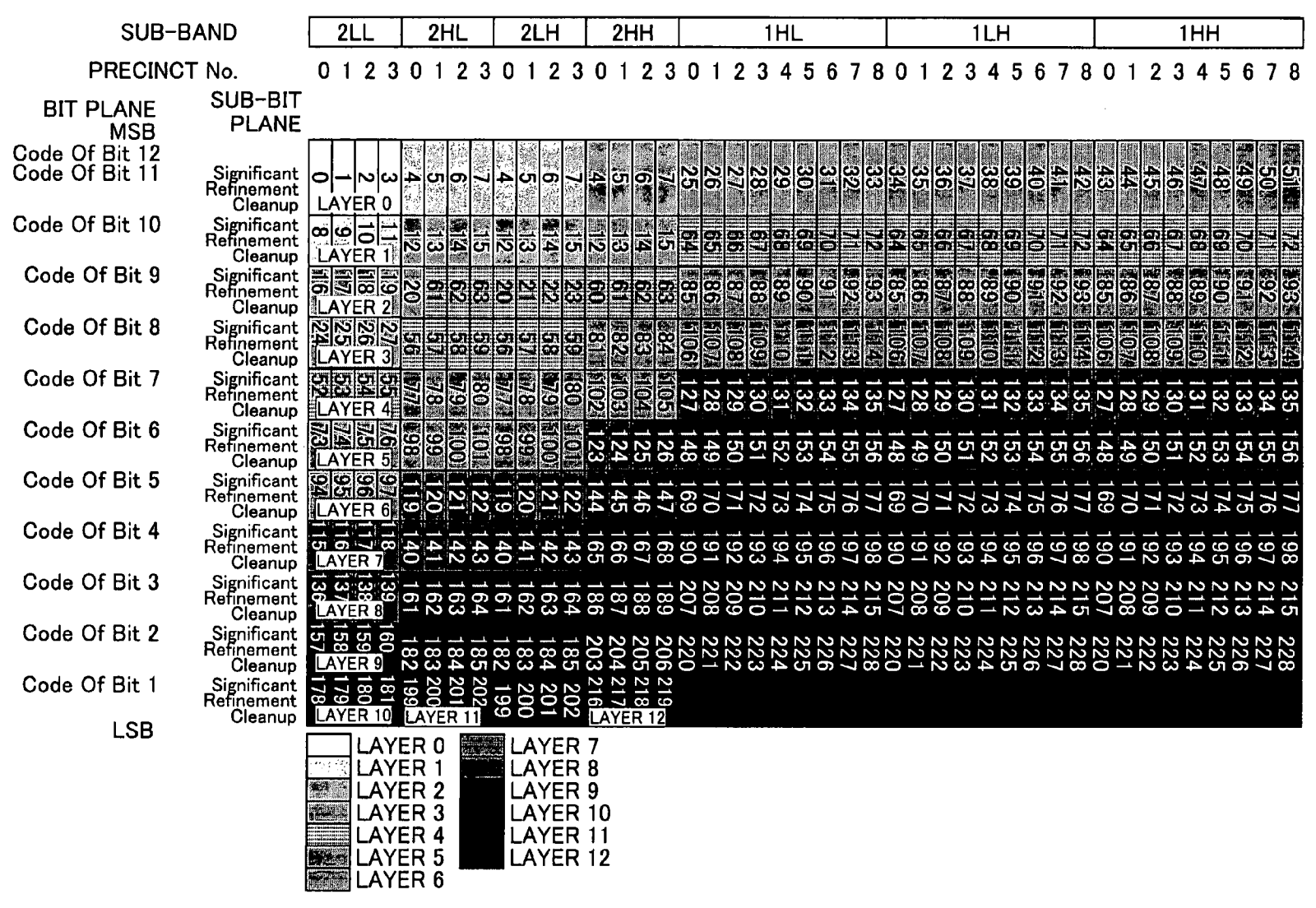

FIG. 5 is a diagram for illustrating the relation between precincts and code blocks. FIGS. 6 through 8 are tables showing an example of packets and layers in a case of decomposition level 2 (resolution level=3), in which FIG. 6 shows an example of a typical layer structure, FIG. 7 shows an example of a layer structure that allows thumbnails to be output to corresponding devices, and FIG. 8 shows an example of a layer structure that allows thumbnails to be output in accordance with the capacity of transmission lines.

The wavelet coefficients having gone through the process of quantization are divided into precincts for each sub-band. In FIG. 5, one precinct (for example, precinct $8_{p4}$) is formed of three rectangular domains having the same relative spatial position. Another such precinct is precinct $8_{p6}$). That is, a group of three domains having the same relative spatial position (indicated as precincts in FIG. 5) is treated as one precinct. Here, an original image 8 is divided into four tiles at decomposition level 1, namely, tiles $8_{t0}$, $8_{t1}$, $8_{t2}$, and $8_{t3}$. Further, each precinct is divided into non-overlapping rectangular code blocks (e.g. code blocks $8_{4b0}$, $8_{4b1}$, . . . in precinct $8_{p4}$). The code blocks serve as a basic unit during entropy encoding in the entropy encoding/decoding unit 4.

In order to enhance encoding efficiency, coefficients may be decomposed into units of bit planes that are arranged in sequence for each pixel or code block, to thereby allow a layer of one or more bit planes to be formed. That is, layers are structured according to the significance of the coefficients of the bit planes, and the encoding process is conducted for each of the layers. In one example, only the most significant layer (MSB) and few layers ranked lower than the MSB are subjected to encoding, and the other remaining layers including the lowest ranked layer (LSB) are truncated.

FIG. 6 shows an example of packets and layers (number of layers=10), where the decomposition level is set at 2 (resolution level=3). In FIG. 6, the small vertically elongated rectangles are packets, and the numbers indicated inside the packets are packet numbers. Layers are illustrated as horizontally elongated rectangular domains with different shades. That is, in this example, layer 0 includes the packets of the packet numbers 0 through 51, layer 1 includes the packets of the packet numbers 52 through 72, layer 2 includes the packets of the packet numbers 73 through 93, layer 3 includes the packets of the packet numbers 94 through 114, layer 4 includes the packets of the packet numbers 115 through 135, layer 5 includes the packets of the packet numbers 136 through 156, layer 6 includes the packets of the packet numbers 157 through 177, layer 7 includes the packets of the packet numbers 178 through 198, layer 8 includes the packets of the packet numbers 199 through 215, and layer 9 includes the packets of the remaining packet numbers 216 through 228. The relations between the packets and the precincts, etc., vary depending on the progression sequence, the number of divided layers, etc. Therefore, the layer structure as described above is merely one example.

FIG. 7 shows an example of a layer structure allowing thumbnails to be output according to a corresponding device. Although this example has a structure similar to that of the layer structure of FIG. 6, thumbnail information (packet numbers 2, 10, 18, 26, 54, 75) illustrated with a same shade is set as correspondence information, which is to be recorded in a recording medium or a header portion of compressed data, for providing a thumbnail display for a digital camera, for example. Thumbnail information for providing a thumbnail display for image viewing software may also be set (packet numbers 96, 117). Thumbnail information for providing a display for a mobile telephone may also be set (2LL).

FIG. 8 shows an example of a layer structure allowing thumbnails to be output according to the capacity of a transmission line. In this example, the number of layers is 13 and the decomposition level is set at 2 (resolution level=3). In this example, layer 0 includes the packets of the packet numbers 0 through 3 shown with the same shade; layer 1 includes the packets of the packet numbers 4 through 11 shown with the same shade; layer 2 includes the packets of the packet numbers 4 through 7 and packet numbers 12 through 19 shown with the same shade; layer 3 includes the packets of the packet numbers 12 through 15 and packet numbers 20 through 51 shown with the same shade; layer 4 includes the packets of the packet numbers 52 through 72 shown with the same shade; layer 5 includes the packets of the packet numbers 73 through 93 shown with the same shade; layer 6 includes the packets of the packet numbers 94 through 114 shown with the same shade; layer 7 includes the packets of the packet numbers 115 through 135 shown with the same shade; layer 8 includes the packets of the packet numbers 136 through 156 shown with the same shade; layer 9 includes the packets of the packet numbers 157 through 177 shown with the same shade; layer 10 includes the packets of the packet numbers 178 through 198; layer 11 includes the packets of the packet numbers 199 through 215 shown with the same shade; and layer 12 includes the packets of the packet numbers 216 through 228 shown with the same shade. The relations between the packets and the precincts, etc., vary depending on the progression sequence, the number of divided layers, etc. Therefore, the layer structure as described above is merely one example.

In each of the layer structures shown in FIGS. 6 through 8, encoded data are divided as packets being sequentially added, starting from a packet with a low packet number, until reaching a prescribed size. One layer is determined upon reaching the prescribed size. In the aforementioned layer structures, each bit plane is divided into sub-bit planes, namely, Refinement, Significant, and Cleanup. Nevertheless, more accurate control can be obtained by dividing the bit planes into more sub-bit planes. Furthermore, the priority in the sequence of the packets can be altered so that, for example, the packets may be arranged in a sequence where importance is placed on resolution, image quality, or position. The layer structures shown in FIGS. 6 through 8 correspond to the example described in Step S5 of FIG. 2.

FIG. 9 is a data diagram showing the format of the encoded data of JPEG 2000 generated in the code generating process (code stream structure). Various tag information is added to the encoded data. That is, the encoded data start with an SOC marker $9_s$ indicating the start of the code stream, followed by a main header (Main Header) $9_h$ describing a coding parameter, a quantization parameter, etc., and further followed by encoded data for every tile, as shown in FIG. 9. The encoded data for every tile starts with an SOT marker $9_{st}$, followed by a tile header (Tile Header) $9_{th}$, an SOD marker $9_{sd}$, and tile data (Tile Data; encoded data (bit stream $9_b$)). A tag that defines the end (EOC tag $9_e$) is placed at the end of the code stream (after the final tile data).

Figure 10:
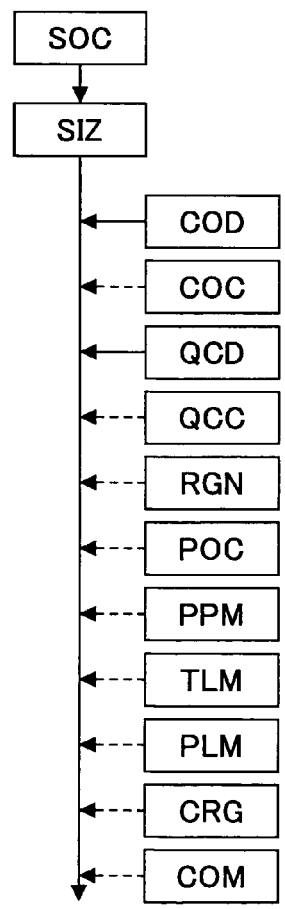
FIG. 10 is a data diagram showing a structure of the main header structure in FIG. 9.

FIG. 10 is a diagram showing the structure of the main header $9h$ of FIG. 9.

As shown in FIG. 10, following the image and the tile size (SIZ), the main header $9h$ includes: coding style default (COD; requisite); a coding style component (COC); quantization default (QCD; requisite); quantization component (QCC); ROI (region of interest) (RGN); progression order change (POC); packed packet header (PPM); tile part length (TLM); packet length (PLM); color registration (CRG); and comment (COM). Other than SIZ and marker segments indicated as requisite (COD, QCD), other components are optional.

Figure 11:
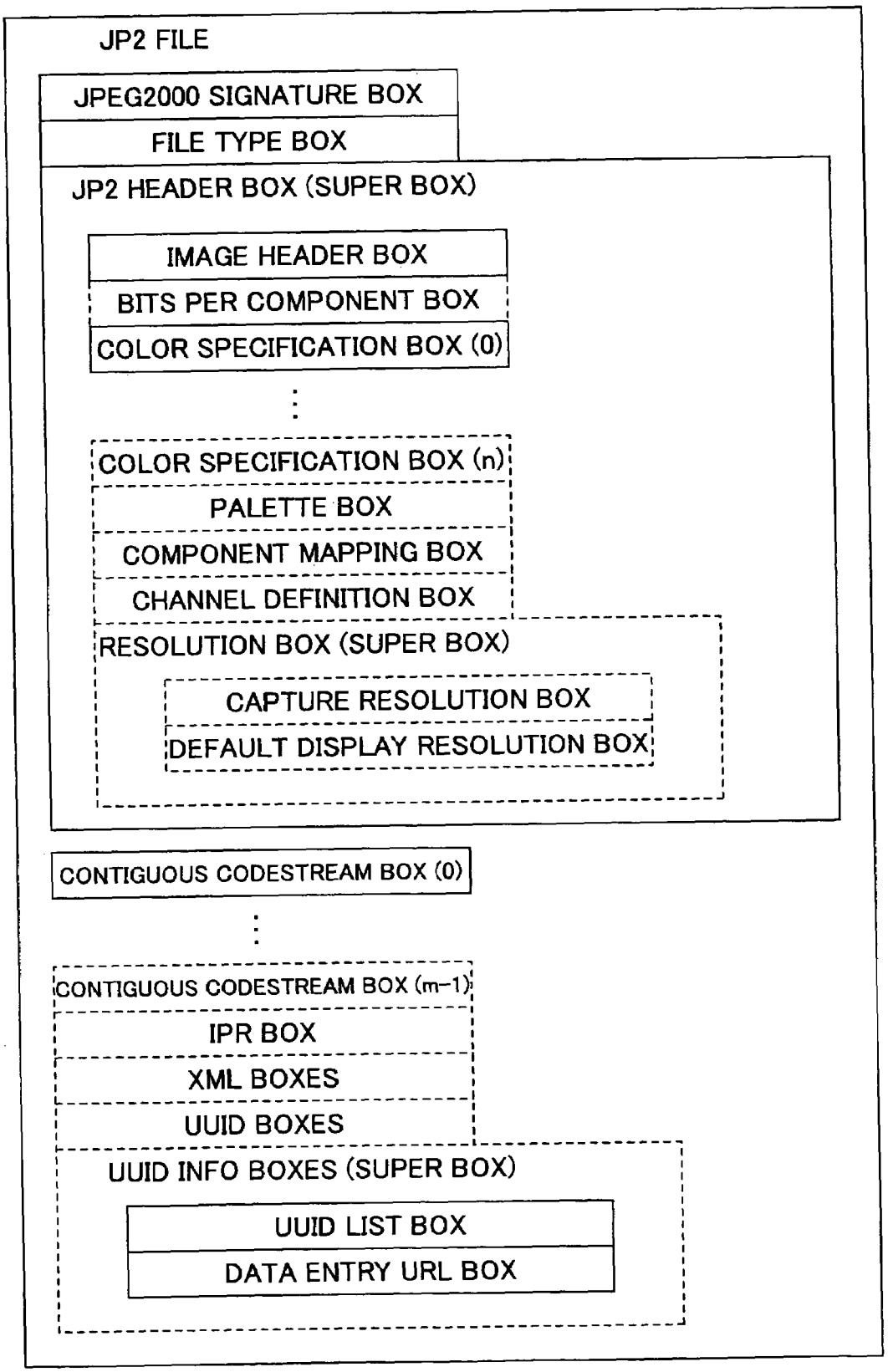
FIG. 11 is a schematic diagram showing a structure of a file format of a basic JPEG 2000 scheme.

FIG. 11 shows a structure of a file format of a JPEG 2000 scheme.

The file format of the JPEG 2000 scheme is referred to as the JP2 file format, and includes the JPEG 2000 coding format described in FIG. 9. The JP2 file format is a format aiming to include information such as image data, meta data, information indicating image property (e.g. gradation value, color space), and/or information on intellectual property rights. The information structure of the JP2 file, being formed by the JP2 file format, is composed of sectors of information (referred to as boxes), and includes information specialized for applications (referred to as meta data). As illustrated with solid lines (requisite) and broken lines (optional) in FIG. 11, the information structure of the JP2 file includes JPEG 2000 Signature box, File Type box, JP2 Header box, and a Contiguous Codestream box. The details thereof are illustrated in FIG. 11.

Meanwhile, in a decoding process, image data are generated from the codestream of each tile of each component. This process is described with reference to FIG. 1. The tag processing unit 5 interprets the tag information attached to the code stream input from the exterior, then the code stream is decomposed into code streams for each tile of each component, and then decoding (decompression) is performed for every code stream of each tile of each component. Along with determining the positions of bits that are targeted for decoding in accordance with the sequence based on the tag information in the code stream, the context is produced from the arrangement of peripheral bits (already decoded) in the quantization/inverse quantization unit 3. In the entropy encoding/decoding unit 4, decoding is performed by probability estimation according to the code stream and the contexts, to thereby reproduce the targeted bits. The targeted bits are disposed at the relevant pixel position. Accordingly, since the decoded data are spatially divided into respective frequency bands (sub-bands), each tile of each component of the image data is restored by performing a two-dimensional wavelet inverse transformation in the two-dimensional wavelet transverse/inverse transform unit 2. The obtained restored data are transformed into image data of the original color system by the color space transform/inverse transform unit 1.

Next, an embodiment according to one embodiment of the present invention is described in detail.

Figure 12:
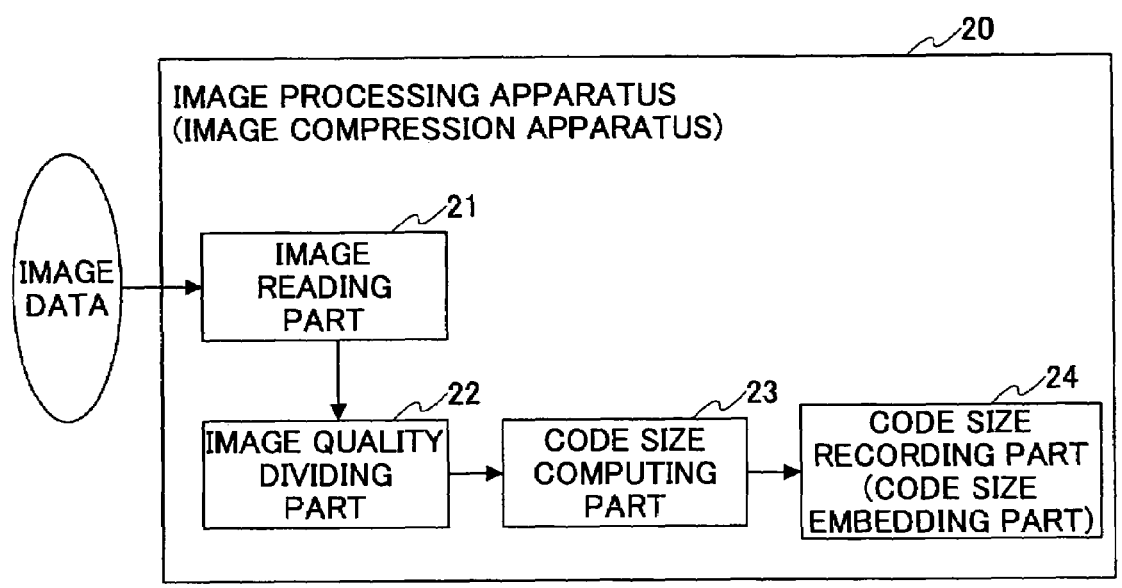
FIG. 12 is a block diagram for illustrating an example of a structure of an image processing apparatus (image compression apparatus) according to an embodiment of the present invention.
Figure 13:
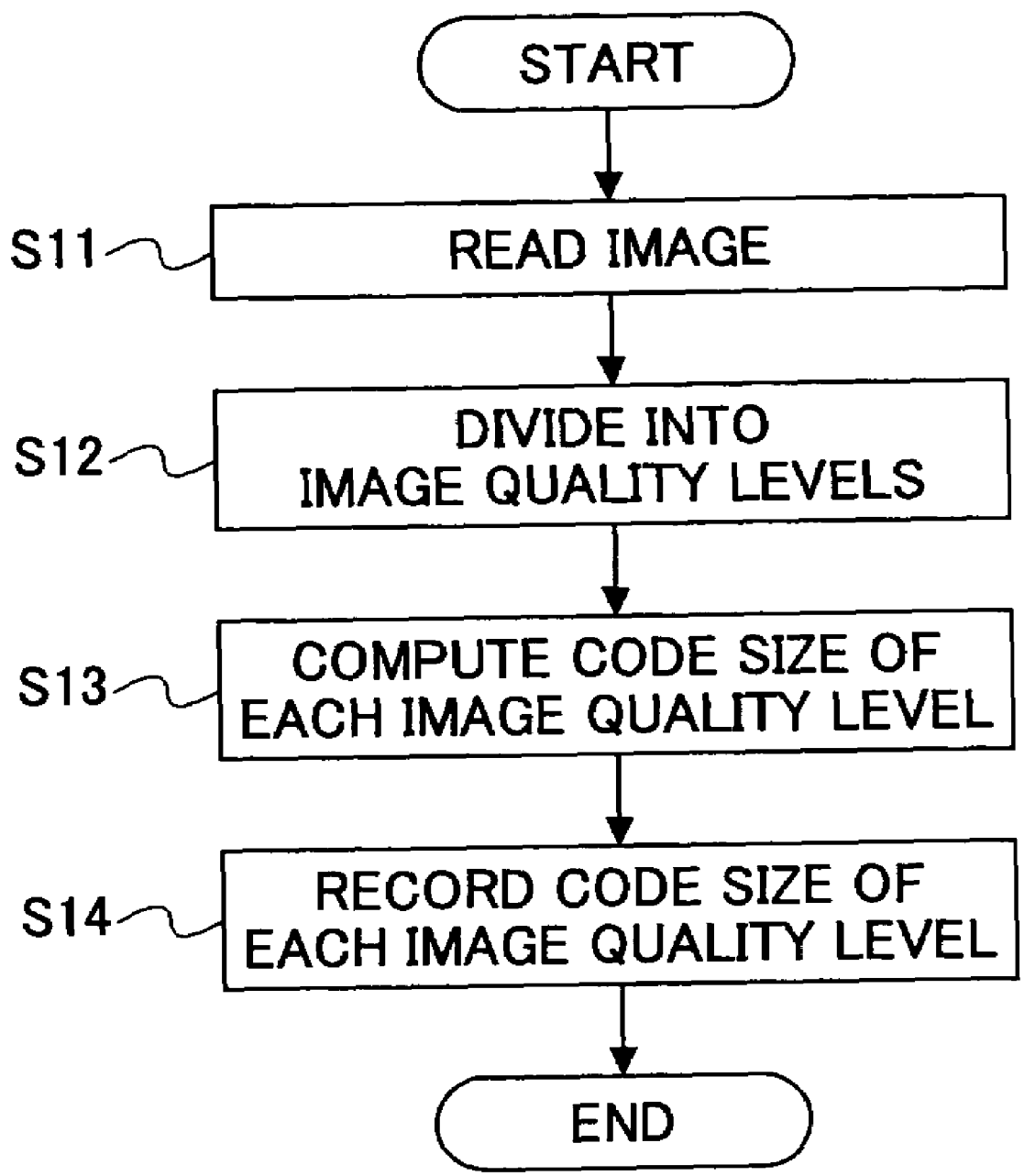
FIG. 13 is a flowchart for illustrating an image processing method (procedure) conducted in FIG. 12, and for illustrating an example of steps conducted with an image processing method according to an embodiment of the present invention.

FIG. 12 is a functional block diagram for illustrating an example of a structure of an image processing apparatus according to an embodiment of the present invention. FIG. 13 is a flowchart for illustrating an example of an image processing method according to the present invention and for illustrating the steps of an image processing method according to an embodiment of the present invention.

The image processing apparatus according to an embodiment of the present invention is an apparatus that generates data for image processing, and includes a dividing unit, a code size computing unit, and a memory unit. FIG. 12 shows an image processing apparatus 20 having: an image reading unit 21; an image quality dividing unit 22 that includes the dividing unit; an image size computing unit 23 that includes the code size computing unit; a code size recording unit 24 that includes the memory unit.

The dividing unit divides coda data of a compressed image into plural image quality levels. Here, the image quality levels may be layers. The code size computing unit computes a code size of each image quality level. The memory unit stores a corresponding relation between image quality and code size according to the computed code size of each image quality level. With the foregoing units, a corresponding relation between image quality and code size of each image quality (information on a corresponding relation between image quality and code size of each image quality) can be generated.

With the image processing apparatus 20, the image reading unit 21 (may also be referred to as "code reading unit") reads image data (may also be referred to as "code data of a compressed image") (Step S11), and then, the image quality dividing unit 22 divides the code data of the compressed image into plural image quality levels (Step S12). Then, the code size computing unit 23 computes the code size of each of the image quality levels (Step S13). Next, the code size recording unit 24 records a corresponding relation between image quality and code size according to the code size of each of the image quality levels computed in the code size computing unit 23 (Step S14). Here, the recording may be conducted in various recording media, such as RAM or ROM.

FIG. 12 is also a functional block diagram for illustrating an example of a structure of an image compression apparatus according to an embodiment of the present invention.

The image compression apparatus according to an embodiment of the present invention is an apparatus that generates compressed code data of an image, and includes a dividing unit, a code size computing unit, and an embedding unit as an alternate of the memory unit. The embedding unit embeds the corresponding relation between image quality and code size into the codes according to the code sizes of each image quality level computed in the code size computing unit. The embedding unit may conduct storage or temporary storage before embedding the corresponding relation into the codes. The image compression apparatus 20 shown in FIG. 12 has a structure where a code size embedding unit 24 is employed as an alternate of the code size recording unit of the aforementioned image processing apparatus. The embedding unit 24 may embed the corresponding relation as thumbnail information into a header portion of compressed data read by the image reading unit 21 or code data divided by the image dividing unit 24.

As exemplary alternative locations for embedding thumbnail information (recording location), there is, for example, the COM marker in FIG. 10, the file format XML boxes in FIG. 11, the file format UUID boxes in FIG. 11, etc. An exemplary XML description is given below.

```
XML description
<?xml version="1.0" encoding="Shift-JIS"?>
<!DOCTYPE html
    PUBLIC "-//W3C//DTD XHTML 1.0 Strict//EN"
    "http://www.w3.org/TR/xhtml1/DTD/xhtml1-strict.dtd">
<html xmlns="http://www.w3.org/1999/xhtml" xml:lang="ja" lang="ja">
  <head>
    <title>THUMBNAIL</title>
  </head>
  <body>
      <p> 3 LL </p>
  </body>
</html>
```

Figure 14:
FIG. 14 is a table showing an example of a corresponding relation that is employed by the image processing apparatus (image compression apparatus) of FIG. 12.

In the image processing apparatus and the image compression apparatus according to the embodiments of the present invention shown in FIGS. 12 through 14, a corresponding relationship between image quality and code size is obtained by dividing an image into plural image quality levels. However, in an image processing apparatus (/image compression apparatus) according to another embodiment of the present invention, a rectangular domain may be used instead of image quality. Here, the dividing unit divides code data of a compressed image into plural rectangular domains. Then, the code size computing unit computes the code size of each rectangular domain, and then, the memory unit (/embedding unit) stores a corresponding relation between the domains and code sizes according to the code sizes of each of the rectangular domains computed in the code size computing unit. A unit that is able to divide code data based on tiles, precincts, or code blocks may be provided. That is, the domain on which the division is conducted may be a tile, a precinct, or a code block.

Further, in an image processing apparatus (/image compression apparatus) according to another embodiment of the present invention, a color component may be used instead of image quality level. Here, the dividing unit divides code data of a compressed image into plural color components. Then, the code size computing unit computes the code size of each component, and then, the memory unit (/embedding unit) stores a corresponding relation between the components and code sizes according to the code sizes of each of the components computed in the code size computing unit.

Further, in an image processing apparatus (/image compression apparatus) according to another embodiment of the present invention, a resolution level may be used instead of image quality level. Here, the dividing unit divides code data of a compressed image into plural resolution levels. Then, the code size computing unit computes the code size of each resolution level, and then, the memory unit (/embedding unit) stores a corresponding relation between the resolution levels and code sizes according to the code sizes of each of the resolution levels computed in the code size computing unit.

Further, in an image processing apparatus (/image compression apparatus) according to another embodiment of the present invention, a packet may be used instead of image quality level. Here, the dividing unit divides code data of a compressed image into plural packets. Then, the code size computing unit computes the code size of each packet, and then, the memory unit (/embedding unit) stores a corresponding relation between the packets and code sizes according to the code sizes of each of the packets computed in the code size computing unit.

Figure 15:
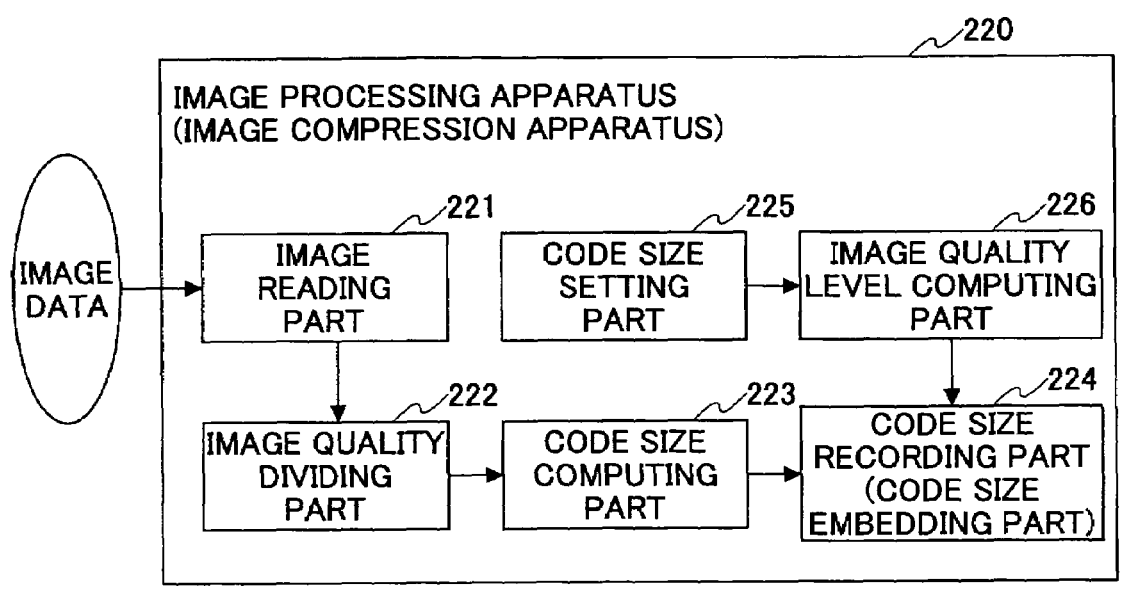
FIG. 15 is a block diagram for illustrating an example of a structure of an image processing apparatus (image compression apparatus) according to another embodiment of the present invention.
Figure 16:
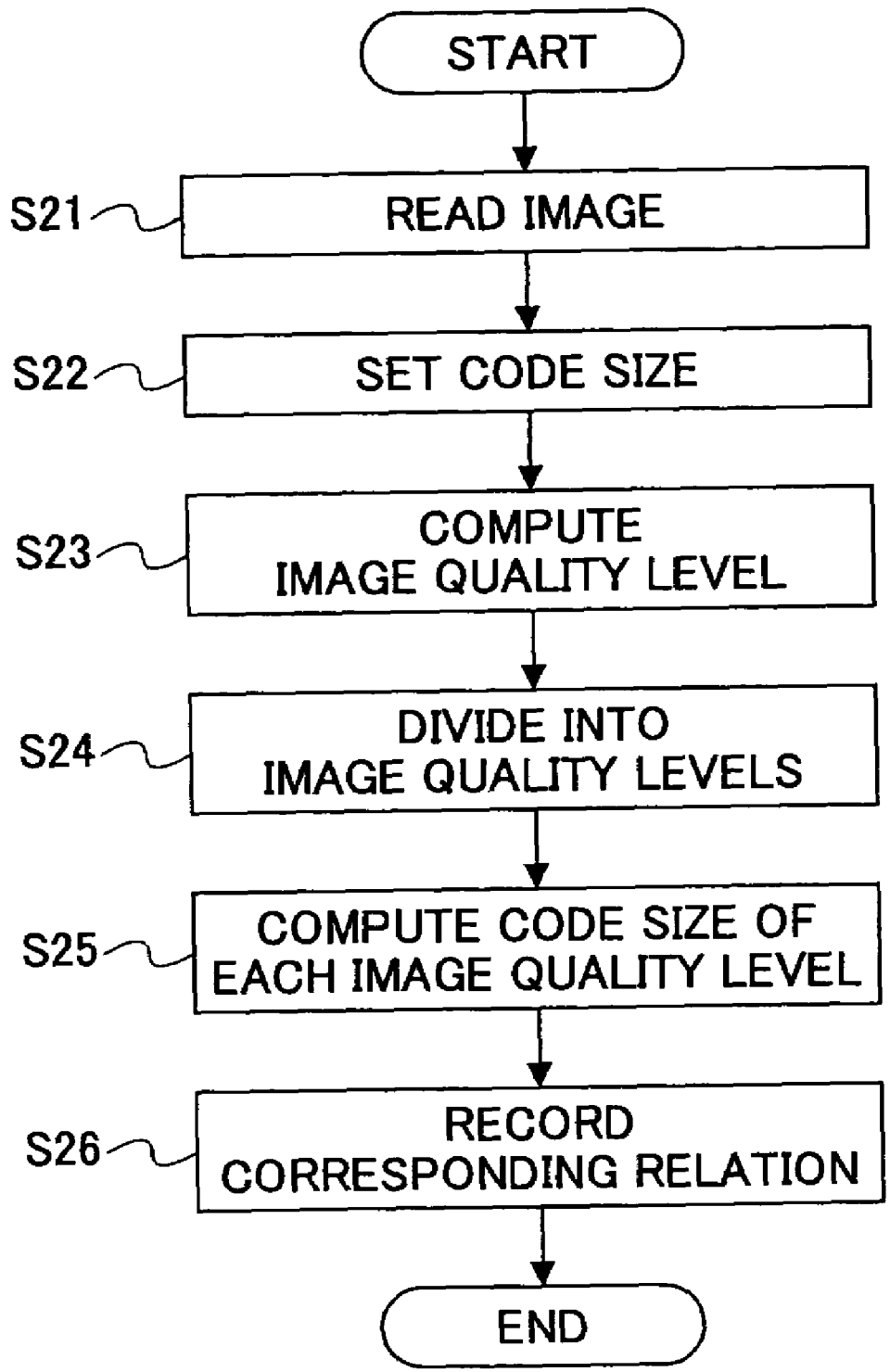
FIG. 16 is a flowchart for illustrating an image processing method (procedure) conducted in FIG. 15, and for illustrating an example of steps conducted with an image processing method according to another embodiment of the present invention.

FIG. 15 is a functional block diagram for illustrating an example of a structure of an image processing apparatus according to another embodiment of the present invention. FIG. 16 is a flowchart for illustrating an example of an image processing method according to another embodiment of the present invention shown in FIG. 15 and for illustrating the steps of an image processing method according to another embodiment of the present invention. In addition, FIG. 15 is also a functional block diagram for illustrating an example of a structure of an image compression apparatus according to another embodiment of the present invention.

The image processing apparatus according to another embodiment of the present invention is an apparatus that generates data for image processing, and includes a code size setting unit, an image quality level computing unit, a dividing unit, a code size computing unit, and a memory unit. FIG. 15 shows an image processing apparatus 220 having: an image reading unit 221; an image quality dividing unit 222 that includes the dividing unit; an image size computing unit 223 that includes the code size computing unit; a code size recording unit 224 that includes the memory unit; a code size setting unit 225 that includes the code size setting unit; and a image quality computing unit that includes the image quality level computing unit.

The code size setting unit sets at least one kind of code size (an example is given below), and then, the image quality level computing unit computes an image quality level that matches the set code size. The dividing unit divides code data of a compressed image into plural image quality levels. -Here, the image quality level may be a layer. The code size computing unit computes a code size of each image quality level. The memory unit stores a corresponding relation between image quality and code size according to the image quality level computed in the image quality level computing unit and the code size computed in the code size computing unit. With the foregoing units, a corresponding relation between image quality and code size of each image quality (information on a corresponding relation between image quality and code size of each image quality) can be generated.

With the image processing apparatus 220, the image reading unit 221 (may also be referred to as "code reading unit") reads image data (may also be referred to as "code data of a compressed image") (Step S21), and then, the image quality dividing unit 222 divides the code data of the compressed image into plural image quality levels (Step S24). Then, the code size computing unit 223 computes the code size of each of the image quality levels (Step S25). In addition, the code size setting unit 225 sets at least one kind of code size (Step S22), and the image quality level computing unit 226 computes an image quality level matching with the set code size (Step S23). There is, however, no specific order for conducting the steps S22 and S23 with respect to steps S21, S24, and S25. Then, the code size recording unit 224 records a corresponding relation between image quality and code size according to the image quality computed in the image quality level computing unit 226 and the code size computed in the code size computing unit 223 (Step S26). Here, the recording may be conducted in various recording media, such as RAM or ROM.

The code size setting unit may set at least one kind of code size based on, for example, the type of transmission line for data transmission, the capacity of a transmission line for data transmission, the type of image display apparatus, the resolution of a display of an image display apparatus, or the processing speed of an image display apparatus.

The type of transmission line may be, for example, "Ethernet (trademark) (100 M bps)," "Ethernet (trademark) (1 G bps)," "Ethernet (trademark) (10 M bps)," "Optical Cable (1.1 G bps)," "ADSL (8 M bps)," and/or "Dial-up line (5.6 K bps)." The capacity of a transmission line may be, for example, "100 M bps (Ethernet (trademark))," "1 G bps (Ethernet (trademark))," "10 M bps (Ethernet (trademark))," "1.1 G bps (Optical Cable)," "8 M bps (ADSL)," and/or "5.6 K bps (Dial-up line)." The type of image display apparatus may be, for example, a mobile phone, a CRT, and/or a printer. The display resolution (display resolution of an image display apparatus) may be, for example, VGA, XVGA, and/or QCIF. The processing speed of an image display apparatus may be, for example, in a CPU with a clock of 500 MHz, 1 GHz, and/or 2 GHz. Here, memory capacity may also be added.

Similar to the embodiments of the image compression apparatus described with FIG. 12, the description of the embodiments of the image processing apparatus described with FIGS. 15 and 16 may be applied to the description of the image compression apparatus according to another embodiment of the present invention, so further details of the image compression apparatus are omitted. Furthermore, an image processing apparatus (/image compression apparatus) in another embodiment according to the present invention may employ a color component, a resolution level, or a packet instead of an image quality level, but the description thereof is omitted since the description may apply to the foregoing description of the image processing apparatus (/image compression apparatus) shown with FIGS. 12 through 16.

In the above description, the foregoing image processing apparatus and image compression apparatus according to the embodiments of the present invention conducts a process of storing a corresponding relation or a process of embedding a corresponding relation into a code. Next, a description of an image processing apparatus conducting a code truncating process after the foregoing processes is given below.

Figure 17:
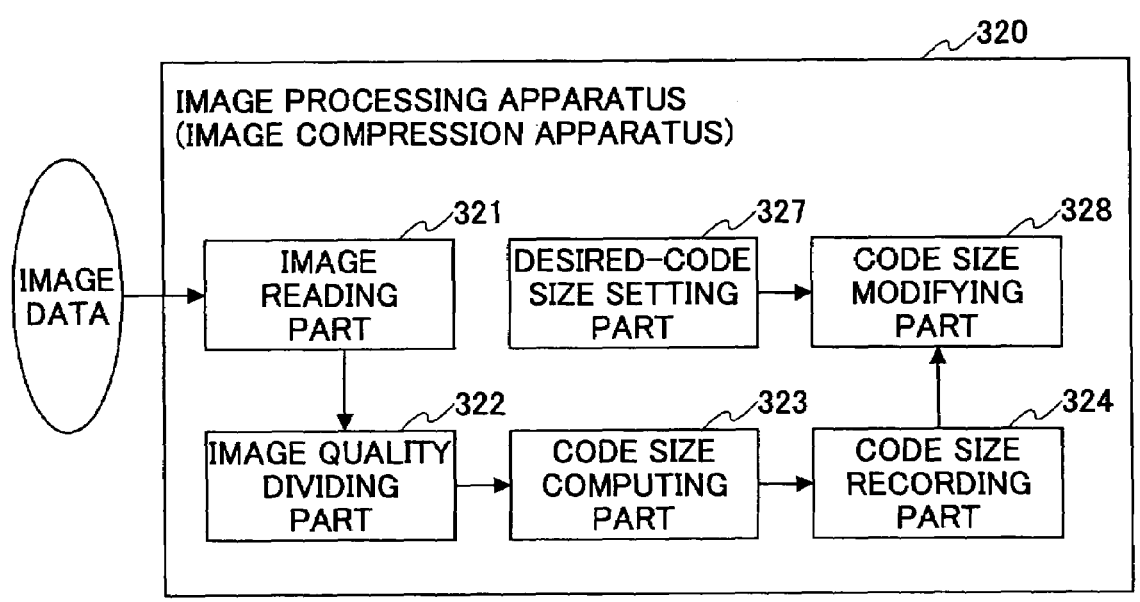
FIG. 17 is a block diagram for illustrating an example of a structure of an image processing apparatus (image compression apparatus) according to another embodiment of the present invention.
Figure 18:
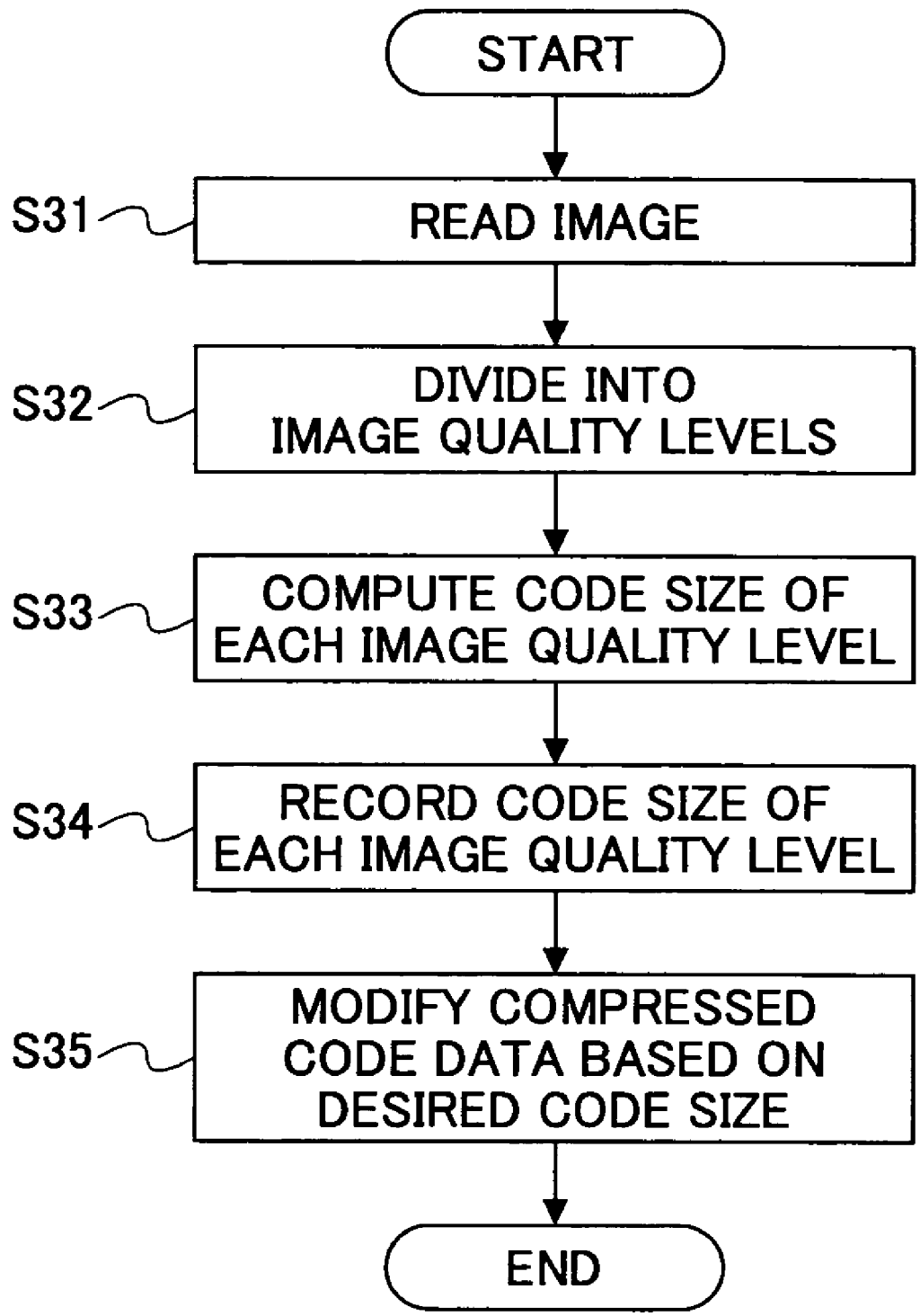
FIG. 18 is a flowchart for illustrating an image processing method (procedure) conducted in FIG. 17, and for illustrating an example of steps conducted with an image processing method according to another embodiment of the present invention.

FIG. 17 is a functional block diagram for illustrating an example of a structure of an image processing apparatus according to another embodiment of the present invention. FIG. 18 is a flowchart for illustrating an example of an image processing method according to another embodiment of the present invention shown in FIG. 17 and for illustrating the steps of an image processing method according to another embodiment of the present invention.

The image processing apparatus according to another embodiment of the present invention includes a dividing unit, a code size computing unit, a memory unit, a desired-code size setting unit, and a modifying unit. FIG. 17 shows an image processing apparatus 320 having: an image reading unit 321; an image quality dividing unit 322 that includes the dividing unit; an image size computing unit 323 that includes the code size computing unit; a code size recording unit 324 that includes the memory unit; a code size setting unit 327 that includes the code size setting unit; and a code size modifying unit 328 that includes the modifying unit.

The desired-code size setting unit sets a desired code size. The modifying unit modifies compressed code data to a desired size set by the code size setting unit based on a corresponding relation stored in the memory unit. That is, the image processing apparatus in this embodiment modifies (truncates) code data to a desired size based on stored corresponding relation information.

With the image processing apparatus 320, the image reading unit 321 (may also be referred to as "code reading unit") reads image data (may also be referred to as "code data of a compressed image") (Step S31), and then, the image quality dividing unit 322 divides the code data of the compressed image into plural image quality levels (Step S32). Then, the code size computing unit 323 computes the code size of each of the image quality levels (Step S33). Then, the code size recording unit 24 records a corresponding relation between image quality and code size according to the code size of each image quality level computed in the code size computing unit 323 (Step S34). Here, the recording may be conducted in various recording media, such as RAM or ROM. Subsequent to Step S34, the code size modifying unit 328 modifies compressed image data based on the desired code size set in the code size setting unit 327 (Step S35).

In this embodiment according to the present invention, the desired-code setting unit and the modifying unit may be provided to the image processing apparatus of the embodiments shown in FIGS. 15 and 16, and applied in the above-described manner, so detail descriptions thereof are omitted. In this case, prior to, subsequent to, or parallel to the steps S31 through S33, the code size setting unit 225 sets at least one kind of code size, and then, the image quality level computing unit 226 computes the image quality level that matches with the set code size. Then, in Step S34, the code size recording unit 324, taking the computed image quality level into consideration, stores a corresponding relation, and then, the code size modifying unit 328 modifies code size based on the stored corresponding relation.

In another embodiment according to the present invention, the image processing apparatus may process compressed code data generated by the image compression apparatus of one of the embodiments described with FIGS. 12 through 16. This image processing apparatus, using a modifying unit, may modify compressed code data into a desired code size set by the desired-code size setting unit based on a corresponding relation embedded in the compressed code data generated by the image compression apparatus. In this embodiment also, code data is modified (truncated) to a desired size based on information of a corresponding relation embedded into a code.

Figure 19:
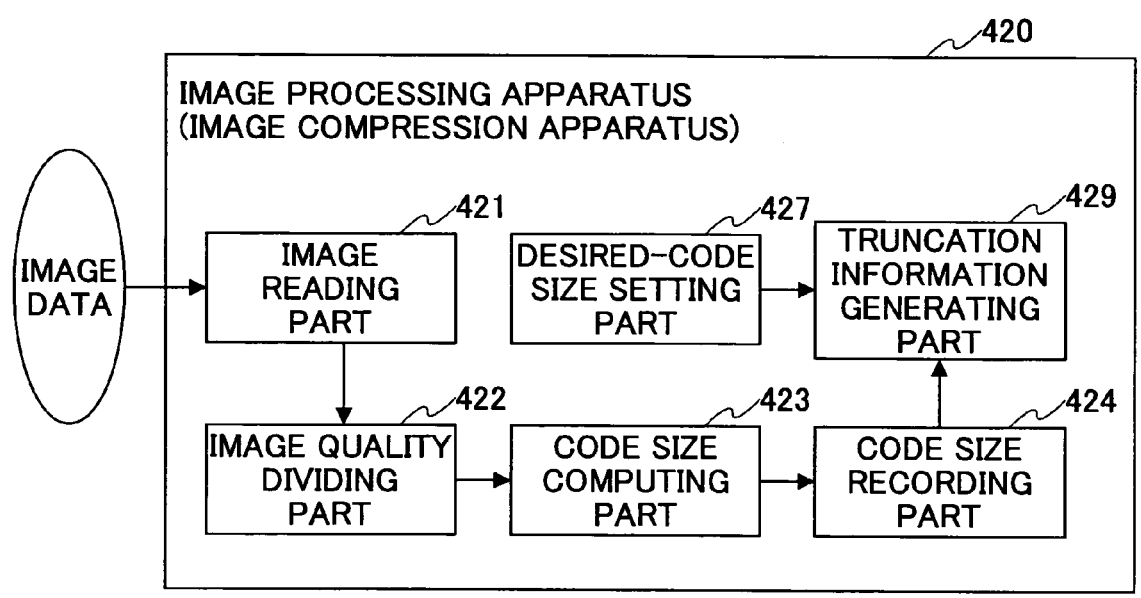
FIG. 19 is a block diagram for illustrating an example of a structure of an image processing apparatus (image compression apparatus) according to another embodiment of the present invention.
Figure 20:
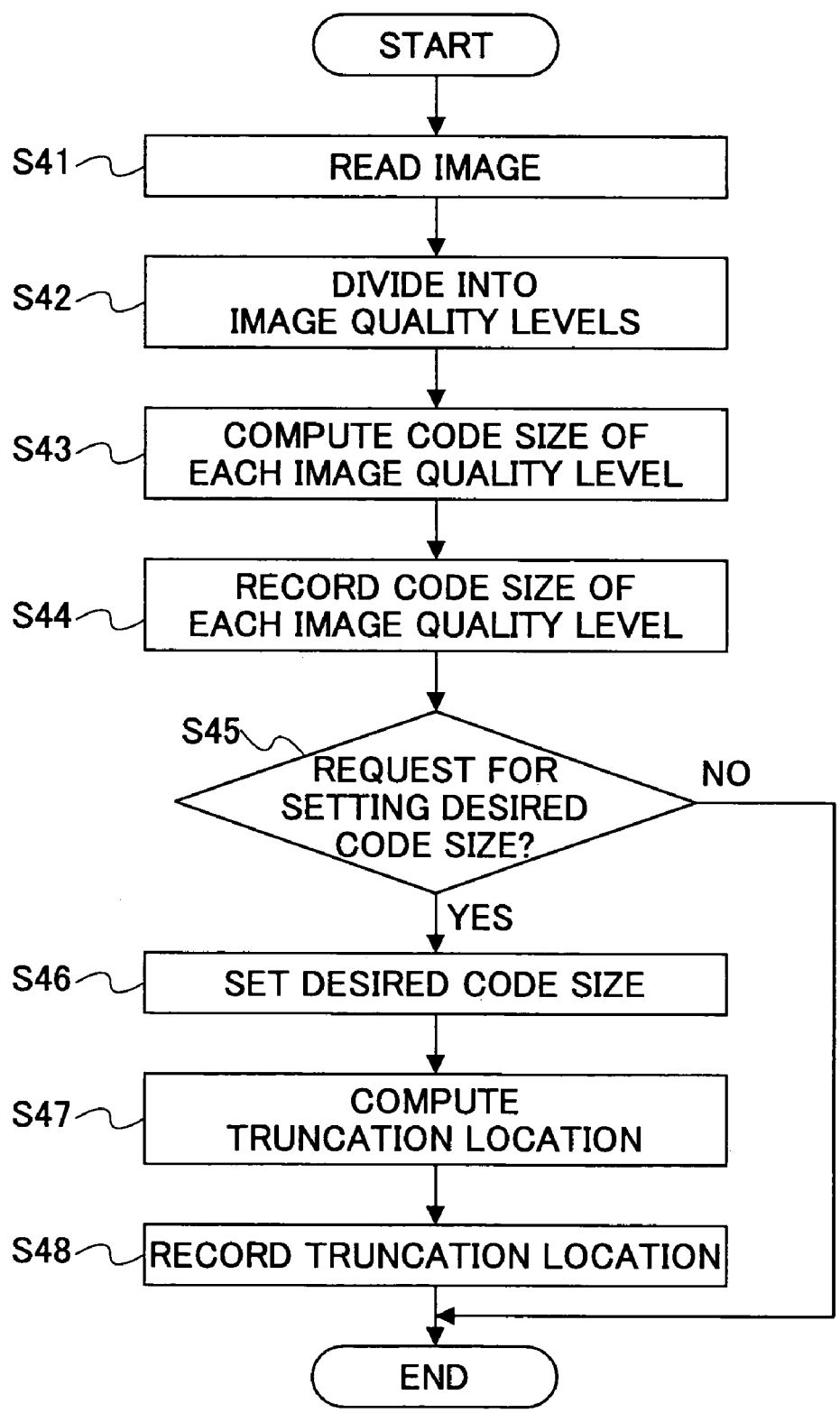
FIG. 20 is a flowchart for illustrating an image processing method (procedure) conducted in FIG. 19, and for illustrating an example of steps conducted with an image processing method according to another embodiment of the present invention.

FIG. 19 is a functional block diagram for illustrating an example of a structure of an image processing apparatus according to another embodiment of the present invention. FIG. 20 is a flowchart for illustrating an example of an image processing method according to another embodiment of the present invention shown in FIG. 19 and for illustrating the steps of an image processing method according to another embodiment of the present invention.

The image processing apparatus according to another embodiment of the present invention includes a dividing unit, a code size computing unit, a memory unit, a desired-code size setting unit, a location computing unit, and a location information memory unit. FIG. 19 shows an image processing apparatus 420 having: an image reading unit 421; an image quality dividing unit 422 that includes the dividing unit; an image size computing unit 423 that includes the code size computing unit; a code size recording unit 424 that includes the memory unit; a desired-code size setting unit 427 that includes the code size setting unit; and a truncation information generating unit 429 that includes the location computing unit and the location information memory unit.

The desired-code size setting unit sets a desired code size. The location computing unit computes a truncation location that matches with the desired code size set in the desired-code size setting unit based on a corresponding relation stored in the memory unit. The location information memory unit stores the truncation location computed in the location computing unit. The image processing apparatus according to this embodiment adds truncation information for generating further truncation location upon request at any time. That is, truncation information is generated when requested, instead of generating (modifying) truncation information beforehand as in the embodiment shown in FIGS. 17 and 18.

With the image processing apparatus 420, the image reading unit 421 (may also be referred to as "code reading unit") reads image data (may also be referred to as "code data of a compressed image") (Step S41), and then, the image quality dividing unit 422 divides the code data of the compressed image into plural image quality levels (Step S42). Then, the code size computing unit 423 computes the code size of each of the image quality levels (Step S43). Then, the code size recording unit 424 records a corresponding relation between image quality and code size according to the code size of each image quality level computed in the code size computing unit 423 (Step S44). Here, the recording may be conducted in various recording media, such as RAM or ROM. Subsequent to Step S44, the desired-code size setting unit 427 determines whether there is a request to set a desired-code size (Step S45). If there is no such request the process is ended. If there is such request, the desired-code size setting unit 427 set the desired-code size (Step S46). The truncation information generating unit 429 computes truncation location (Step S47), and records the computed truncation information (Step S48). Then, the process is finished.

In this embodiment according to the present invention, the desired-code setting unit, the location computing unit, and the location information memory unit may be provided to the image processing apparatus of the embodiments shown in FIGS. 15 and 16, and applied in the above-described manner, so detail descriptions thereof are omitted. In this case, prior to, subsequent to, or parallel to the steps S41 through S43, the code size setting unit 225 sets at least one kind of code size, and then, the image quality level computing unit 226 computes the image quality level that matches with the set code size. Then, in Step S44, the code size recording unit 424, taking the computed image quality level into consideration, stores a corresponding relation, and then, the truncation information generating unit 429 generates truncation information based on the stored corresponding relation.

The image processing apparatus according to another embodiment of the present invention may process the compressed code data generated from the image compression apparatus according to one of the embodiments according to the present invention shown in FIGS. 12 through 16. The image processing apparatus, using the location computing unit, may compute a truncation location that matches with the desired code size set in the desired-code size setting unit based on a corresponding relation embedded in compressed code data generated by the image compression apparatus, and thus store the computed truncation location information in the location information memory unit. In this embodiment also, truncation information is added upon request at any time for generating truncation information.

Next, an exemplary output result of decompressing a compressed image with an image processing apparatus (apparatus including a truncation function) according to the embodiments of the present invention is described.

Figure 21:
FIG. 21 shows an example of an original image.
Figure 22A:
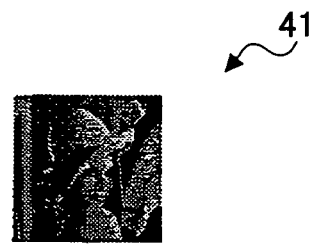
FIGS. 22A through 22D show resultant images processed by an image processing apparatus and output from a decompression side of the image processing apparatus according to an embodiment of the present invention.

FIG. 21 shows an example of an original image 40, and FIGS. 22A through 22 D shows a result of processing the original image 40 in FIG. 21 with the image compression apparatus according to an embodiment of the present invention, in which the result is output from a decompression side of the image processing apparatus.

Figure 22B:
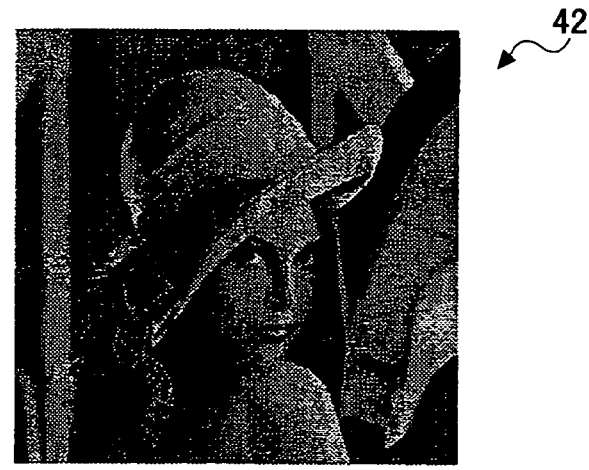
Figure 22C:
Figure 22D:
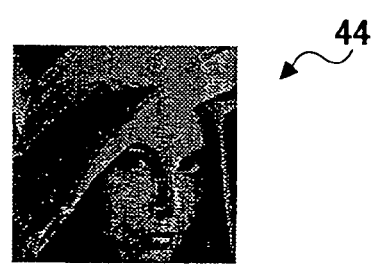

In a case of designating a low resolution image of the original image 40 in accordance with the correspondence relation, an image 41 as shown in FIG. 22A is output. Similarly, in a case of designating a single component in accordance with the correspondence relation, an image 42 as shown in FIG. 22B is output; in a case of designating only layer 0 in accordance with the correspondence relation, an image 43 as shown in FIG. 22C is output; and in a case of designating tiles of a center portion in accordance with the correspondence relation, an image 44 as shown in FIG. 22D is output.

In consequence, the image processing apparatus and image compression apparatus according to embodiments of the present invention include a corresponding relation for generating compressed image data that allow thumbnails of an image to be quickly output without requiring a large space for storing compressed image data. Accordingly, a process of transforming an image into a form that is suited for a given output device can be conducted at high speed. For example, a corresponding relation may be recorded in the header information of the compressed data or to a recording medium in an image processing apparatus. Accordingly, an image transmission system may, for example, transmit compressed code data having a corresponding relation embedded in a header portion thereof, or transmit a corresponding relation and compressed code data separately.

Furthermore, the image processing apparatus (apparatus including a truncation function) according to one embodiment of the present invention includes a corresponding relationship for generating compressed image data that allow thumbnails of an image to be quickly output without requiring a large space for storing compressed image data, and modifies compressed data or generates information for such modification based on the corresponding relation. Accordingly, a process of transforming an image into a form that is suited for a given output device can be conducted at high speed. Accordingly, an image transmission system may, for example, transmit compressed code data having information for the modification (modification information) embedded in a header portion thereof, or transmit modification information and compressed code data separately.

Although description of the embodiments of the present invention is given above mainly in the form of an image processing apparatus, an image compression apparatus, and an image processing apparatus with a truncation function, the present invention may be provided in the form of an image processing method, an image compression method, or an image processing method with a truncation process, that includes the processes conducted by the foregoing apparatuses as shown with the steps in FIGS. 13, 15, 16, 18, and 20. Further, the present invention may be provided in the form of a program enabling a computer to function as the foregoing apparatuses or to execute the foregoing methods (a program having the foregoing processes installed therein). Further, embodiments of the present invention may be provided in the form of a computer-readable recording medium having the aforementioned program recorded thereto (a computer-readable recording medium having the aforementioned processes recorded thereto). Furthermore, embodiments of the present invention may also be provided in the form of a system that includes the same advantages of the foregoing apparatuses such as providing a corresponding relation for generating compressed image data that allow thumbnails of an image to be quickly output without requiring a large space for storing compressed image data. The aforementioned program and recording medium can be easily executed by following the description of the aforementioned embodiments and the description given below.

An example of a program and a recording medium having the program stored therein for providing an image processing, an image compression function and/or an image processing function with a truncation function according to one embodiment of the present invention is next described. As examples of the recording medium, there are a CD-ROM, a magnetic optical disk, a DVD-ROM, a flexible disk, a flash memory, and other various kinds of ROM and RAM. At least one of the functions of image processing, image compressing, or image processing with a truncation process can easily be achieved by providing such a recording medium that has a program enabling a computer to perform the aforementioned functions of the present invention recorded thereto. The function of embodiments of the present invention can be executed, for example, in the form of mounting the recording medium to an information processing apparatus (e.g. computer or an apparatus of the like), reading out the program by starting up the program or by transmitting the program to another apparatus, or in the form of storing the program in a storage medium of the information processing apparatus and reading out the program when necessary.

Figure 23:
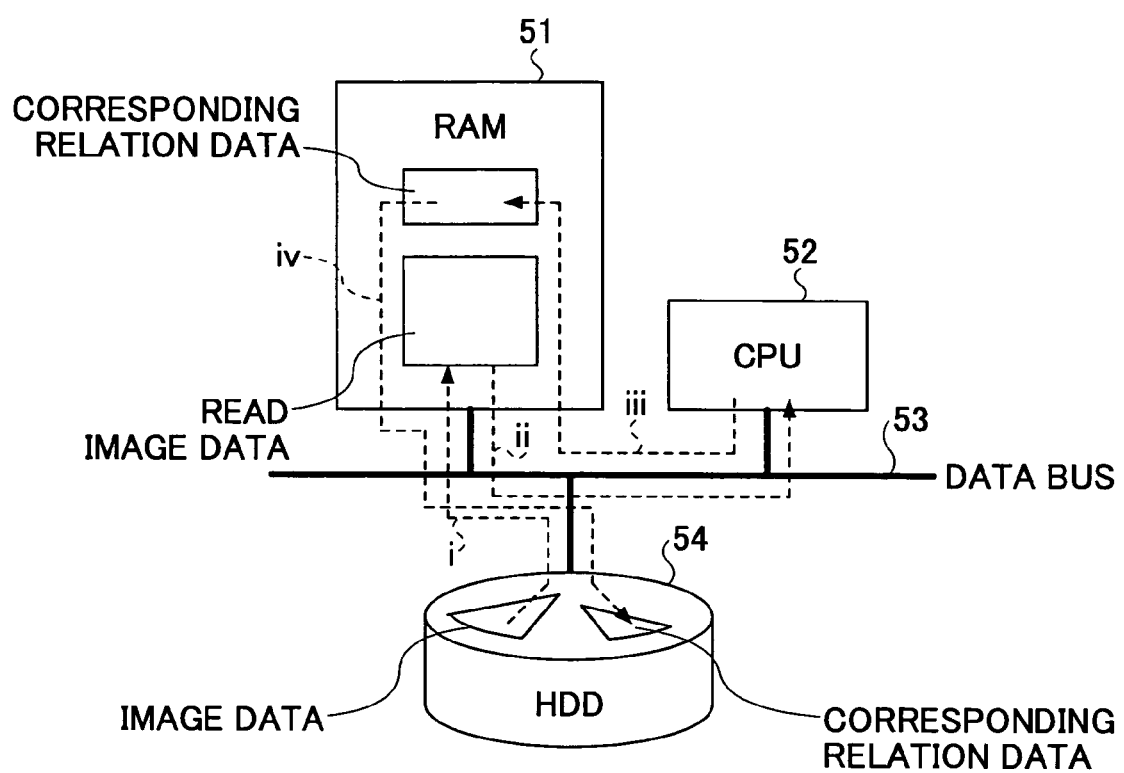
FIG. 23 is a block diagram showing an example of a structure of an image processing apparatus and/or image compression apparatus according to an embodiment of the present invention.

Here, an example of a structure of an apparatus applicable for the foregoing embodiment is described. FIG. 23 is an example showing a structure of an image processing apparatus or an image compression apparatus according to one embodiment of the present invention.

This example of the image processing apparatus according to one embodiment of the present invention includes a RAM 51, a CPU 52, and an HDD 54 that are connected with a data bus 53. According to the flow described below, corresponding relation data are generated from the image data (may also be compressed code data) of an original image and stored in the HDD 54. In a case of the image compression apparatus according to one embodiment of the present invention, compressed code data having corresponding relation data embedded thereto are generated and stored in the HDD 54, but further details in the case of the image compression apparatus are omitted. Further details in the case of the image processing apparatus with a truncation function are also omitted.

In the flow of the image processing apparatus according to one embodiment of the present invention, first, image data (or compressed image data) of the original image stored in the HDD 54 are read into the RAM 51 in compliance to a command from the CPU 52 (i). Then, the CPU 52 reads the image data in the RAM 51 and generates corresponding relation data by applying the processes of the present invention including, for example, generating a corresponding relation (ii). Then, the CPU 52 writes the generated corresponding relation data to another area in the RAM 51 (iii). Then, the corresponding relation data are recorded onto the HDD 54 according to commands from the CPU 52 (iv).

Hence, with one embodiment of the present invention, a corresponding relation (corresponding relation data) can be provided for generating compressed image data allowing thumbnails of an image to be quickly output without requiring large space for storing compressed image data. Accordingly, a process of transforming an image into a form that is suited for a given output device can be conducted at high speed.

Furthermore, with one embodiment of the present invention, a corresponding relation (corresponding relation data) can be provided for generating compressed image data allowing thumbnails of an image to be quickly output without requiring large space for storing compressed image data, and compressed data can be modified or information for the modification can be generated based on the corresponding relation. Accordingly, a process of transforming an image into a form that is suited for a given output device can be conducted at high speed.

Further, the present invention is not limited to these embodiments, but various variations and modifications may be made without departing from the scope of the present invention.

The present application is based on Japanese Priority Application No. 2003-037919 filed on Feb. 17, 2003, with the Japanese Patent Office, the entire contents of which are hereby incorporated by reference.

What is claimed is:

1. An image processing apparatus for generating data to be used for image processing, the image processing apparatus comprising:
a dividing unit to divide code data of a compressed image into a plurality of segments;
a code size computing unit to compute a code size corresponding to each of the plurality of segments;
a memory unit to store the corresponding relation between the code size and each of the plurality of segments;
a desired code size setting unit to set a desired code size; and
a modifying unit to modify the code data to the desired code size based on the corresponding relation stored in the memory unit.

2. The image processing apparatus as claimed in claim 1, further comprising:
a location computing unit to compute a truncation location matching with the set desired code size based on the corresponding relation stored in the memory unit; and
a location information unit to store information of the computed truncation location.

3. An image processing apparatus for generating data to be used for image processing, the image processing apparatus comprising:
a code size setting unit to set one or more code sizes; an image quality level computing unit to compute an image quality level matching with the set one or more code sizes;
a dividing unit to divide code data of a compressed image into a plurality of image quality levels;
a code size computing unit to compute a code size corresponding to each of the plurality of image quality levels;
a memory unit to store the corresponding relation between the code size and each of the plurality of image quality levels;
a desired code size setting unit to set a desired code size; and
a modifying unit to modify the code data to the desired code size based on the corresponding relation stored in the memory unit.

4. The image processing apparatus as claimed in claim 3, further comprising:
a location computing unit to compute a truncation location matching with the set desired code size based on the corresponding relation stored in the memory unit; and
a location information memory unit to store information of the computed truncation location.

5. An image processing apparatus for generating compressed code data of an image, the image compression apparatus comprising:
a dividing unit to divide code data of a compressed image into a plurality of segments;
a code size computing unit to compute a code size corresponding to each of the plurality of segments;
an embedding unit to embed the corresponding relation between the code size and each of the plurality of segments into the code data;
a desired code size setting unit to set a desired code size; and
a modifying unit to modify the code data to the desired code size based on the corresponding relation embedded into the code data.

6. The image processing apparatus, as claimed in claim 5, further comprising:
a location computing unit to compute a truncation location matching with the set desired code size based on the corresponding relation embedded into the code data; and
a location information memory unit to store information of the computed truncation location.

7. An image processing apparatus for generating compressed code data of an image, the image compression apparatus comprising:
a code size setting unit to set one or more code sizes;
an image quality level computing unit to compute an image quality level matching with the set one or more code sizes;

a dividing unit to divide code data of a compressed image into a plurality of image quality levels;

a code size computing unit to compute a code size corresponding to each of the plurality of image quality levels;

an embedding unit to embed the corresponding relation between the code size and each of the plurality of image quality levels into the code data;

a desired code size setting unit to set a desired code size; and a modifying unit to modify the code data to the desired code size based on the corresponding relation embedded into the code data.

8. The image processing apparatus as claimed in claim 7, further comprising:

a location computing unit to compute a truncation location matching with the set desired code size based on the corresponding relation embedded into the code data; and a location information memory unit to store information of the computed truncation location.

9. An image processing method for generating compressed code data of an image, the image compression method comprising:

a) setting one or more code sizes;

b) computing an image quality level matching with the set one or more code sizes;

c) dividing code data of a compressed image into a plurality of image quality levels;

d) computing a code size corresponding to each of the plurality of image quality levels;

e) embedding the corresponding relation between the code size and each of the plurality of image ciuality levels into the code data;

f) setting a desired code size; and g) modifying the code data to the desired code size based on the corresponding relation stored in a memory unit.

10. The image processing method as claimed in claim 9, further comprising:

h) computing a truncation location matching with the set desired code size based on the corresponding relation stored in step e); and i) storing information of the computed truncation location.

11. An image processing method for generating data to be used for image processing, the image processing method comprising:

a) setting one or more code sizes;

b) computing an image quality level matching with the set one or more code sizes;

c) dividing code data of a compressed image into a plurality of image quality levels;

d) computing a code size corresponding to each of the plurality of image quality levels;

e) storing the corresponding relation between the code size and each of the plurality of image quality levels;

f) setting a desired code size; and g) modifying the code data to the desired code size based on the corresponding relation stored in the memory unit.

12. The image processing method as claimed in claim 11, further comprising:

h) computing a truncation location matching with the set desired code size based on the corresponding relation stored in the memory unit; and i) storing information of the computed truncation location.

13. An image processing method for generating compressed code data of an image, the image compression method comprising:

a) dividing code data of a compressed image into a plurality of segments;

b) computing a code size corresponding to each of the plurality of segments; and c) embedding the corresponding relation between the code size and each of the plurality of segments into the code data;

d) setting a desired code size; and e) modifying the code data to the desired code size based on the corresponding relation embedded into the code data.

14. The image processing method as claimed in claim 13, further comprising:

f) computing a truncation location matching with the set desired code size based on the corresponding relation embedded into the code data; and g) storing information of the computed truncation location.

15. An image processing method for generating compressed code data of an image, the image compression method comprising:

a) setting one or more code sizes;

b) computing an image quality level matching with the set one or more code sizes;

c) dividing code data of a compressed image into a plurality of image quality levels;

d) computing a code size corresponding to each of the plurality of image quality levels;

e) embedding the corresponding relation between the code size and each of the plurality of image quality levels into the code data;

f) setting a desired code size; and g) modifying the code data to the desired code size based on the corresponding relation embedded into the code data.

16. The image processing method as claimed in claim 15, further comprising:

h) computing a truncation location matching with the set desired code size based on the corresponding relation embedded into the code data; and i) storing information of the computed truncation location.

* * * * *